US007725543B2

(12) United States Patent
Shibata et al.

(10) Patent No.: US 7,725,543 B2
(45) Date of Patent: May 25, 2010

(54) NETWORK COMMUNICATION DEVICE FOR TRANSMITTING/RECEIVING AN EMAIL MESSAGE CONTAINING A DISPOSITION NOTIFICATION REQUEST

(75) Inventors: Tetsuya Shibata, Yawata (JP); Takeshi Nakamura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 1248 days.

(21) Appl. No.: 10/456,250

(22) Filed: Jun. 5, 2003

(65) Prior Publication Data
US 2003/0233421 A1    Dec. 18, 2003

(30) Foreign Application Priority Data
Jun. 12, 2002  (JP)  ............................ 2002-171073
Jun. 25, 2002  (JP)  ............................ 2002-185272

(51) Int. Cl.
G06F 15/16  (2006.01)
(52) U.S. Cl. ............................. 709/206; 709/207
(58) Field of Classification Search ................. 709/206, 709/224
See application file for complete search history.

(56) References Cited

U.S. PATENT DOCUMENTS

| | | | | |
|---|---|---|---|---|
| 5,057,935 | A | * 10/1991 | Williams | ............... 379/100.03 |
| 5,675,733 | A | * 10/1997 | Williams | ..................... 709/206 |
| 5,790,790 | A | *  8/1998 | Smith et al. | ................. 709/206 |
| 6,175,859 | B1 | *  1/2001 | Mohler | ....................... 709/206 |
| 6,314,454 | B1 | * 11/2001 | Wang et al. | .................. 709/206 |
| 6,823,367 | B1 | * 11/2004 | Wakasugi et al. | ........... 709/206 |
| 6,854,007 | B1 | *  2/2005 | Hammond | .................. 709/206 |

(Continued)

FOREIGN PATENT DOCUMENTS

JP    2001-309109    11/2001

(Continued)

OTHER PUBLICATIONS

Fajman R., RFC 2298: "An Extensible Message Format for Message Disposition Notifications", Network Working Group, Mar. 1998.*

Primary Examiner—Ramy Osman
(74) Attorney, Agent, or Firm—David G. Conlin; Steven M. Jensen; Edwards Angell Palmer & Dodge LLP

(57) ABSTRACT

A network communication device is provided with e-mail message composing means and e-mail message transmitting/receiving means. The e-mail message composing means has functions of incorporating an MDN request and return transmission conditions into an e-mail message and of consolidating MDN responses for multiple received e-mail messages into a collective MDN response to compose a single e-mail message. The e-mail message transmitting/receiving means has a function of recognizing the MDN request and the return transmission conditions. The network communication device is further provided with: reception result monitoring means which monitors the reception of an e-mail message to see whether it is a success or failure and which composes an MDN response; and disposition notification controlling means which monitors return transmission conditions incorporated in a received e-mail message and which, if the return transmission conditions are met, instructs the e-mail message composing means to compose a collective MDN response and the e-mail message transmitting/receiving means to transmit the composed collective MDN response. Thus, the invention enables collective confirmation of MDN responses to multiple e-mail messages.

32 Claims, 28 Drawing Sheets

U.S. PATENT DOCUMENTS

| | | | |
|---|---|---|---|
| 6,952,720 B2 * | 10/2005 | Guedalia et al. | 709/206 |
| 6,999,989 B2 * | 2/2006 | DeLaCruz | 709/206 |
| 7,027,567 B1 * | 4/2006 | Scott et al. | 379/88.25 |
| 7,120,671 B2 * | 10/2006 | Gusler et al. | 709/206 |
| 7,516,185 B2 * | 4/2009 | Knoerle et al. | 709/206 |
| 7,581,221 B2 * | 8/2009 | Lai et al. | 709/206 |
| 2002/0040387 A1 * | 4/2002 | Lessa et al. | 709/206 |
| 2007/0100991 A1 * | 5/2007 | Daniels et al. | 709/224 |

FOREIGN PATENT DOCUMENTS

JP   2002-055926   2/2002

* cited by examiner

MDN
(RESPONSES CONSOLIDATED AFTER A PERIOD)

MDN
(RESPONSES CONSOLIDATED AFTER A PERIOD ONLY FOR SUCCESSFUL RESULTS)

FIG. 5

RESPONSE MESSAGE FROM RECEIVING END IN REPLY TO MDN REQUEST (a) HEADER

Date: Thu, 20 Sep 2001 12:08:26 +0900

From: Sharp_Doc_InternetFAX@sharp.co.jp (Internet FAX)

To: SHARP D1 InternetFAXSharp_Doc_InternetFAX@sharp.co.jp ← RETURN ADDRESS AS DESIGNATED BY TRANSMITTING END Subject: Your message was processed successfully. (MDN)

MIME-Version: 1.0

Content-Type: multipart/report; report-type=disposition-notification; boundary="__boundary__"

Message-ID: <20010920030050293.AAA239@sharp.co.jp>

---

(b) MAIN TEXT

--__boundary__

Content Type: text/plain; charset="US-ASCII"

Content-Transfer Encoding: 7bit

This is a Return Receipt for the mail that you sent to
"Sharp_Doc_InternetFAX@sharp.co.jp".
The message and attached files[s] may have been printed,
faxed or saved. This is no guarantee that the message
has been read or understood.

---

(c) MDN RESULT INFORMATION

--__boundary__

Content-Type: message/disposition-notification

Content-Transfer-Encoding: 7bit

Final-Recipient: rfc822;Sharp_Doc_InternetFAX@sharp.co.jp

Original-Message-Id: <111@SHARP_D1>,<AAA@SHARP_D1>,<BBB@SHARP_D1> ← FEATURE OF THE INVENTION: RESPONSE COVERING THREE MESSAGES (MADE BASED ON MESSAGE ID GIVEN BY TRANSMITTING END)

Disposition: automatic-action/MDN-sent-automatically; dispatched   } A

Media-AcceptFeatures: (& (color=Binary)   ← STATUS OF THREE MESSAGES: SUCCEEDED (image -file-structure=TIFF-limited)

(dpi=200) (dpi -xyratio=[200/100,200/200])

(image -coding=[MH,MR,MMR])

(MRC -mode=0)

(paper -size=[A4,B4,A3]))

--__boundary__--

RETURN MESSAGE TO MDN REQUEST FROM RECEIVING END (EX. OF RESULT INFORMATION, ETC.)

MDN (SUCCESSFUL)

MDN (FAILED)

MDN
(RESPONSES CONSOLIDATED AFTER A PERIOD
OR RECEPTION OF DESIGNATED NUMBER OF MESSAGES)

MDN
(URGENT RESPONSE DURING CONSOLIDATION
OF RESPONSES TO DESIGNATED NUMBER OF MESSAGES: SUCCESS)

MDN
(URGENT RESPONSE DURING CONSOLIDATION
OF RESPONSES TO DESIGNATED NUMBER OF MESSAGES: FAILURE)

MDN (MODIFICATION OF TIME ELAPSED: REDUCTION)

MDN (CONSOLIDATED AFTER A PERIOD, TIME EXTENDED)

MDN (CONSOLIDATED AFTER A PERIOD, TIME ADDED)

MDN
(COLLECTIVE RETURN MESSAGE REQUEST, PACKAGE, COLLECTIVE)

THIS INVENTION: RETURN MESSAGE WHEN THREE MESSAGES ARE SENT
(CONSOLIDATED INTO A SINGLE COLLECTIVE RESPONSE): DISPLAY ON MACHINE MAIN BODY

FIG. 17

TRANSMITTED MAIL MESSAGE

(a) HEADER

Date: 21 Sep 2001 09:25:21 +0900
To: document@sharp.co.jp
From: SHARP D1 InternetFAX   <Sharp_Doc_InternetFAX@sharp.co.jp>
Subject: InternetFAX : SHARP D1
Sender: Sharp_Doc_InternetFAX@sharp.co.jp (Internet FAX)
Reply-To: <Sharp_Doc_InternetFAX@sharp.co.jp>
X-Mailer: X-SHARP Network Scanner System

[RECIPIENT'S ADDRESS OF RETURN MESSAGE]
[CONDITIONS DEFINING MDN RESPONSE TIMING (NOTIFICATION CONDITION INFORMATION)]

(a-1) REQUEST FOR MDN
   (EX. 1: RETURN MESSAGE CONDITIONS IN ACCORDANCE WITH
   THE INVENTION PROVIDED IN MDN FIELD)
Disposition-Notification-To: SHARP D1 InternetFAX   Sharp_Doc_InternetFAX@sharp.co.jp / 22 Sep 2001 09:00:00 +0900

(a-2) REQUEST FOR MDN
   (EX. 2: OPTIONS FIELD AS DEFINED IN MDN IS USED)
Disposition-Notification-To: SHARP D1 InternetFAX   Sharp_Doc_InternetFAX@sharp.co.jp Disposition-Notification-Options: 22 Sep 2001 09:00:00 +0900

MIME-Version: 1.0
Content-Type: multipart/mixed; boundary="SHARP-SmTP-BOUNDARY-A30"
Content-Transfer-Encoding: 7bit
Message-ID:<111@SHARP_D1>   ← [MESSAGE IDENTIFYING ID]

---

(b) MAIN TEXT

--SHARP-SmTP-BOUNDARY- A30
Content-Type: text/plain; charset=iso-2022-jp
Content-Transfer-Encoding: 7bit
Content-X-CIAJWNETFAX: IGNORE MACHINE: SHARP_D1
MODEL: SHARP AR-M450
LOCATION:
FILE FORMAT: TIFF-F MH(G3)
RESOLUTION: 200 DPI X 200 DPI
THE ATTACHMENT IS A SCANNED TIFF IMAGE FILE.

---

(c) ATTACHMENT

--SHARP-SmTP-BOUNDARY- A30
Content-Type: image/tiff;
   name="SHARP_D1_InternetFAX_20010921_092521.tif"
Content-Transfer-Encoding: base64
Content-Disposition: attachment;
   filename="SHARP_D1_InternetFAX_20010921_092521.tif"

SUkqAAgAAAARAP4ABAABAAAAgAAAAABBAABAAAAwAYAAAEBBAABAAAAJwkAAAIBAwA
AAMBAwABAAAAwAAAAYBAwABAAAAAAAAAoBAwABAAAAgAAABEBBAABAAAACgEAAB

FIG. 19

TRANSMITTED MAIL MESSAGE

(a) HEADER

Date: 22 Sep 2001 09:00:00 +0900
From: Sharp_Doc_InternetFAX@sharp.co.jp (Internet FAX)
To: SHARP D1 InternetFAX  Sharp_Doc_InternetFAX@sharp.co.jp ← RECIPIENT'S ADDRESS OF RETURN MESSAGE AS SPECIFIED IN TRANSMITTED MESSAGE
Subject: Your message was processed successfully. (MDN)
MIME-Version: 1.0
Content-Type: multipart/report; report-type=disposition-notification; boundary="__boundary__"
Message-ID: <20010920030050293.AAA239@sharp.co.jp>

---

(b) MAIN TEXT

--__boundary__
Content-Type: text/plain; charset="US-ASCII"
Content-Transfer-Encoding: 7bit This is a Return Receipt for the mail that you sent to
"Sharp_Doc_InternetFAX@sharp.co.jp".
The message and attached files[s] may have been printed,
faxed or saved. This is no guarantee that the message
has been read or understood.

---

(c) MDN INFORMATION

--__boundary__
Content-Type: message/disposition-notification
Content-Transfer-Encoding: 7bit Final-Recipient: rfc822;Sharp_Doc_InternetFAX@sharp.co.jp
Original-Message-Id: <111@SHARP_D1>,<AAA@SHARP_D1>,<BBB@SHARP_D1>  } A  ← 3 RELATED, TRANSMITTED MESSAGES
Disposition: automatic-action/MDN-sent-automatically; dispatched
Media-Accept-Features: (& (color=Binary)
(image-file-structure=TIFF-limited)
(dpi=200) (dpi-xyratio=[200/100,200/200])
(image-coding=[MH,MR,MMR])   ← 3 MESSAGES SUCCEEDED
(MRC-mode=0)
(paper-size=[A4,B4,A3]))

--__boundary__--

FIG. 25

FROM: documennt@sharp.co.jp

TO: SHARPD1FAX@sharp.co.jp

SUBJECT: MDN (MESSAGE DISPOSITION NOTIFICATION)

MAIN TEXT:
TRANSMISSION OF MESSAGE-ID <111@SAHRP-D1;;12:08> HAS SUCCEEDED
TRANSMISSION OF MESSAGE-ID <222@SAHRP-D1;;12:18> HAS SUCCEEDED
TRANSMISSION OF MESSAGE-ID <333@SAHRP-D1;;12:28> HAS FAILED

NETWORK COMMUNICATION DEVICE FOR TRANSMITTING/RECEIVING AN EMAIL MESSAGE CONTAINING A DISPOSITION NOTIFICATION REQUEST

FIELD OF THE INVENTION

The present invention relates to a network communication device which transmits/receives e-mail messages over a network. The present invention also relates to: a communication device having a function of responding to a request for a notification of disposition of targeted data in reception data; a communication device which transmits, to the communication device, data including a request for a disposition notification; a data reception processing method of responding to a request for a notification of disposition of targeted data in reception data; a data transmission processing method of transmitting data received by the data reception processing method; a data transmission processing program and a data reception processing program implementing the data transmission processing method and the data reception processing method; and a computer-readable storage medium on which these programs are stored.

BACKGROUND OF THE INVENTION

Recent development of networking has created new applications for network communication devices which transmit/receive e-mail messages over the Internet or like network.

Some newly developed network communication devices can not only capture an image with a built-in scanner function, but also forward the captured image information to a computer or like apparatus connected to the network in the form of an attachment to an e-mail message. Internet facsimile machines (hereinafter, "Internet faxes") have been also developed which incorporate a built-in print function and telephone function in addition to the scanner function.

Referring to FIG. 26, Internet faxes 100, 101 either connect to a host 103, an Internet provider, over a PSTN (Public Switched Telephone Network) 102 or like network and on to the Internet 104 via the host 103 or connect directly to the Internet 104. Internet faxes 100, 101 at the transmitting end and the receiving end transmit/receive e-mail messages while they are being connected to the Internet 104.

A problem occurs under these circumstances where information is transmitted using an e-mail message as in the forgoing: unlike, for example, those cases when information is transmitted by an ordinary facsimile machine, the transmitting end has no means to determine whether the information is received normally or processed properly by the receiving end. Specifically, unlike G3 facsimile machines performing realtime facsimile communication with each other over a PSTN, the transmitting-end machine has no means to determine, upon an e-mail message transmission from the transmitting-end machine, whether the receiving-end machine has normally received or properly processed the e-mail message transmitted from the transmitting-end machine to the receiving-end machine.

Therefore, conventionally, the disposition of an e-mail message must be inconveniently confirmed by a telephone call. The process of transmitting information via e-mail and thereafter confirming the disposition by a telephone call requires redundant action. Also, the process of transmitting information via e-mail and thereafter confirming the disposition by a telephone call causes e-mail communication to lose one of its advantages over telephone communication that the parties involved do not need to talk with each other in real time.

Accordingly, a method is defined by the MDN (Message Disposition Notification) in RFC 2298 which provides a means of notifying of safe disposition of an e-mail message (MDN) whereby upon reception of an e-mail message, the receiving-end machine sends a disposition response back to the transmitting-end machine. This is a method of notifying the transmitting-end machine of reception, progress, etc. regarding the e-mail message at the receiving-end machine by including such information in a message disposition notification in the form of an e-mail message (MDN e-mail message) of a predetermined format. The terms "disposition notification" and "disposition confirmation" are interchangeable. "RFCs" (Requests For Comments) are official documents issued by IETF (Internet Engineering Task Force), an Internet-related technology standards organization. The documents define, for example, specifications and requirements of Internet protocols, such as IP, TCP, HTTP, and FTP, and various Internet-related technologies. They are numbered throughout like "RFC 2298" and publicly available.

The MDN defined in RFC 2298 gives a new "Disposition-Notification-To" field in the header of the e-mail message. Disposition notification is carried out using the field provided that the transmitting-end machine and the receiving-end machine meet the specifications. Specifically, the transmitting-end machine specifies an address in the field to which a disposition notification message should be directed before transmitting the e-mail message, and the receiving-end machine sends an MDN e-mail message to the address specified in the field.

Now, procedures in confirming disposition according to the aforementioned MDN will be described in reference to FIG. 27(*a*) and FIG. 27(*b*). Referring to FIG. 27(*a*), to carry out a disposition notification according to the MDN defined by RFC 2298, first, the following procedures are sequentially implemented as a transmission operation (composition of an e-mail message) at the transmitting end:

1) The user places an original document to be transmitted on a scanner of the transmitting-end machine.
2) The user inputs the e-mail address of the transmission destination to the transmitting-end machine.
3) The user inputs a file format (PDF, TIFF, etc.) for the original document to be transmitted to the transmitting-end machine.
4) The transmitting-end machine captures the original document to prepare an e-mail message for transmission.

If an MDN is to be requested, a "Disposition-Notification-To" field is included in the header of the e-mail message being composed in the e-mail message composition in 4) above.

Meanwhile, the following procedures are sequentially implemented as a reception operation at the receiving end having received an e-mail message.

5) The receiving-end machine recognizes the header of the received e-mail message and implements a confirmation process to check, for example, whether there is any abnormality in the attachment data.
6) The receiving-end machine prints out the received e-mail message.
7) The receiving-end machine composes an MDN e-mail message if it has recognized a "Disposition-Notification-To" field.
8) The receiving-end machine sends the MDN e-mail message to the recipient address specified in the "Disposition-Notification-To" field.

A disposition notification is thus implemented using a "Disposition-Notification-To" field.

Trouble may arise as in as shown in FIG. 27(b) where, as an example, the receiving-end machine receiving an e-mail message transmitted from the transmitting-end machine is unable to print the e-mail message. When this is the case, the receiving-end machine composes an MDN e-mail message notifying of the occurrence of abnormality and sends to the recipient address specified in the "Disposition-Notification-To" field.

Japanese Published Unexamined Patent Application 2001-309109 (Tokukai 2001-309109, published on Nov. 2, 2001) discloses a facsimile machine implementing an MDN method. If an MDN request is sent without receiving an MDN e-mail message from the receiving-end machine within a certain period of time, the facsimile machine outputs a disposition failure alert to notify the user that it has received no MDN e-mail message.

The aforementioned conventional technology has following problems. The user often uses an Internet fax in a similar manner to an ordinary facsimile machine. The user is highly likely to make a setting to request a disposition notification by MDN.

When this is the case, according to the aforementioned conventional technology, an MDN e-mail message is returned at a different time for each e-mail message even when, for example, two or more e-mail messages were successively transmitted, and only a single, collective disposition notification is required after completely transmitting all the e-mail messages.

More specifically, suppose that three e-mail messages were successively transmitted to the same recipient address with 10 minute intervals. A total of three MDN e-mail messages corresponding to the transmitted e-mail messages are then returned with 10 minute intervals. Therefore, every time an MDN e-mail message is returned, the fax machine displays the content of the MDN e-mail message on screen or outputs a transmission report describing the content of the MDN e-mail message, as shown in FIG. 28. Such disposition notification is burdensome to the user.

Here, the main text of the return message includes a message ID which is an identifier actually used in MDN to show which received e-mail message corresponds to which transmitted e-mail message. However, the displayed content is not so limited: for example, the user may be notified of the subject of the transmitted e-mail message, transmission time, and other information.

Another shortcoming in the context of network communication is an undesirable, increased network traffic generated by the transmission, to the transmitting end, of the return messages individually composed for the transmitted e-mail messages.

SUMMARY OF THE INVENTION

Conceived in view of the aforementioned problems, the present invention has an objective to provide a communication device capable of efficient communication over a network and collective confirmation of transmissions at the transmitting end by, when multiple e-mail messages are successively transmitted, consolidating disposition notification messages (return messages) from the receiving end into a single message and returning it.

The present invention has another objective to provide a communication device and the like which enable a disposition notification for multiple transmissions of data to be returned at a desired timing.

To achieve the objectives, a network communication device in accordance with the present invention is provided with e-mail message composing means which composes an e-mail message and e-mail message transmitting/receiving means which transmits/receives an e-mail message. The e-mail message composing means has: a disposition notification request incorporating function of incorporating a disposition notification request for a disposition notification for an e-mail message and return transmission conditions into an e-mail message under consideration and a collective disposition notification response composing function of consolidating disposition notification responses to multiple received e-mail messages into a collective disposition notification response to compose a single e-mail message. The e-mail message transmitting/receiving means has: reception result monitoring means, with a disposition notification request recognizing function of recognizing a disposition notification request and return transmission conditions incorporated in a received e-mail message, which monitors the reception of an e-mail message to see whether it is a success or failure and which composes a disposition notification response; and disposition notification controlling means which monitors the return transmission conditions incorporated in a received e-mail message and which, if the return transmission conditions are met, instructs the e-mail message composing means to compose a collective disposition notification response and the e-mail message transmitting/receiving means to transmit the composed collective disposition notification response.

A communication device in accordance with the present invention has a function of responding to a data disposition notification request contained in received data. To achieve the objectives, the communication device is arranged to include:

receiving means for receiving data;

notification data composing means for, when received data received by the receiving means contains notification request information indicating a disposition notification request, composing notification data for disposition notification;

transmitting means for transmitting the notification data;

notification condition recognizing means for, when the received data contains notification condition information indicating conditions for determining a disposition notification timing, recognizing the conditions indicated in the notification condition information; and transmission controlling means for determining a timing of the transmitting means transmitting the notification data, on the basis of recognition by the notification condition recognizing means.

With the arrangement, if the received data contains, for example, a disposition notification request such as an MDN request in the case of e-mail messages sent over the Internet, the notification data composing means composes notification data for disposition notification in response to the request, and the transmitting means transmits the notification data.

Here, with the arrangement, if the received data contains notification condition information indicating conditions for determining a timing of a disposition notification, the notification condition recognizing means recognizes those conditions. Based the recognition, the transmission controlling means determines the timing of the transmitting means transmitting the notification data.

Therefore, the designation of conditions for determining a timing of a disposition notification at the data transmitting end and the transmission of data to the communication device causes the communication device to transmit notification data for disposition notification at a timing determined under the conditions.

Hence, when, for example, multiple sets of transmission data are transmitted at different times from the data transmitting end to the communication device, the transmitting end receives a consolidated disposition notification after the transmission of the last transmission data, or in other words, receives a consolidated disposition notification for multiple sets of transmission data at a time.

As a result, the task can be conveniently performed whereby, for example, the user at the transmitting end can collectively confirm the disposition notification for the multiple sets of transmission data at one time.

A data reception processing method in accordance with the present invention is a data reception processing method of responding to a data disposition notification request contained in received data. To achieve the objectives, the method includes:

the receiving step in which receiving means receives data;

the notification data composing step in which when the received data received in the receiving step contains notification request information indicating a disposition notification request, notification data composing means composes notification data for a disposition notification;

the notification condition recognizing step in which when the received data contains notification condition information indicating conditions for defining a timing of a disposition notification, notification condition recognizing means recognizes the conditions indicated in the notification condition information;

the transmission timing designating step in which transmission controlling means determines a timing of transmitting the notification data on the basis of recognition in the notification condition recognizing step; and the transmitting step in which transmitting means transmits the notification data at the timing determined in the transmission timing designating step.

A data reception processing program in accordance with the present invention is a program implementing the data reception processing method and causes a computer to function as the individual means and carry out the steps. A computer-readable storage medium in accordance with the present invention is a storage medium on which the data reception processing program is recorded.

The program and medium can also consolidate disposition notifications for multiple sets of transmission data into a single message.

For a fuller understanding of the nature and advantages of the invention, reference should be made to the ensuing detailed description taken in conjunction with the accompanying drawings.

BRIEF DESCRIPTION OF THE DRAWINGS

FIG. 5 is an example of a response message from the receiving end for an MDN request.

FIG. 17 shows the content of a transmitted e-mail message.

FIG. 19 shows a the content of a response message.

FIG. 25 shows the content of an MDN response message.

DESCRIPTION OF THE EMBODIMENTS

Embodiment 1

The following will describe embodiment 1 of a network communication device in accordance with the present invention in reference to FIG. 1 through FIG. 6.

Figure 1:
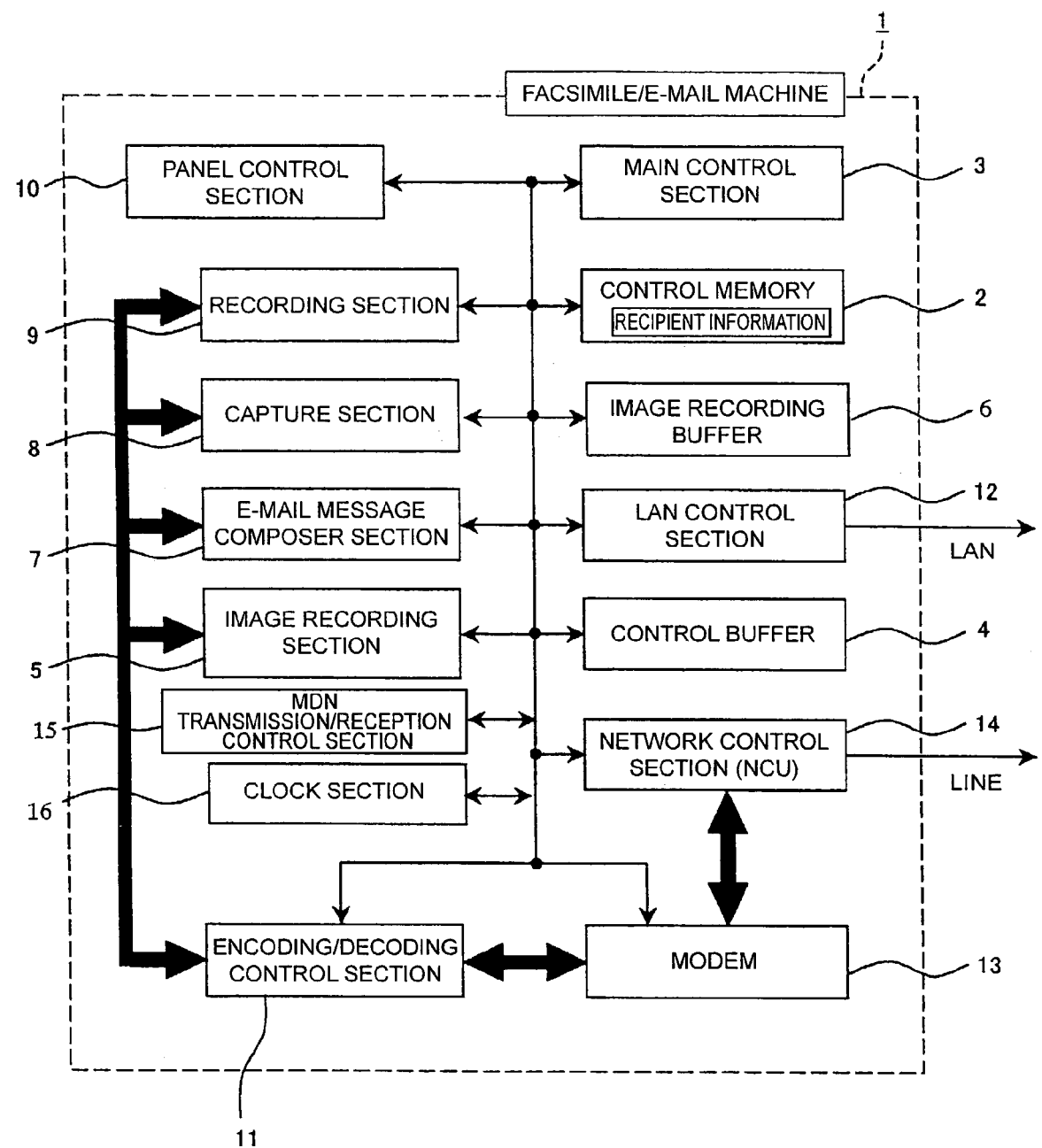
FIG. 1 is a block diagram illustrating an arrangement of a network communication device in accordance with the present invention.

Referring to the block diagram in FIG. 1, an arrangement will be described of a facsimile/e-mail machine (Internet facsimile machine) 1 which represents a network communication device of embodiment 1.

The facsimile/e-mail machine 1 includes a control memory (recipient information storing means) 2, a main control section (disposition notification transmitting means, disposition specifying means) 3, a control buffer 4, an image recording section 5, an image recording buffer 6, an e-mail message composer section (disposition notification controlling means) 7, a capture section 8, a recording section 9, a panel control section 10, an encoding/decoding control section 11, an LAN control section 12, a modem 13, a network control section 14, an MDN transmission/reception control section (disposition notification controlling means, disposition specification controlling means, standby time setting means, standby message count setting means) 15, and a clock section (disposition notification controlling means) 16.

The control memory 2 is made of involatile memory or volatile memory with backup and associated devices, holding control programs and recipient information.

The main control section 3 includes a CPU and other components, controlling the facsimile/e-mail machine 1. The main control section 3 operates as the disposition notification transmitting means and the disposition specifying means.

The control buffer 4 is made up of RAM and used for program data.

The image recording section 5 holds encoded image data, as well as data captured by the capture section 8 (detailed later), reception data, decoded data, etc.

Direct processing is possible using the image recording buffer 6, with the holding of data in the image recording section 5 being skipped.

The e-mail message composer section 7 operates as the MDN controlling means, adding header information to the encoded image data to convert the data into the e-mail message format.

In the facsimile/e-mail machine 1 of embodiment 1, an MDN field (detailed later) is added to the header and extended for use. That is, a field is added for use by the MDN transmission/reception control section 15 (detailed later).

Return transmission conditions to be written in additional MDN fields are preset by the user before transmission and used for e-mail message transmission. The conditions may be changed for a transmission by directly inputting conditions through the panel control section 10 when e-mail message transmission conditions are set.

The capture section 8 is a CCD-based scanner and captures an original document as an original document image at a predetermined resolution for dot image data output.

The recording section 9 is provided with an electrophotographic printer to make a hard copy of (print), for example, original document data received through communication.

The panel control section 10 allows for instructions to capture an original document, input a recipient, etc. and produces screen displays for these purposes. The panel control section 10 includes a display and an console section (neither shown). The display is, for example, a liquid crystal display (LCD) or a CRT display and displays an operation status, transmission destination, etc. The console section has keys (input device) required for operation. The panel control section 10 of the present embodiment is a touch panel in which a display and an console section are integrated. In embodiment 1, a recipient is specified on the touch panel of the panel control section 10. Specified recipient information is stored in the control memory 2.

The encoding/decoding control section 11 encodes original document data after it is captured and decodes it after it is received. That is, the encoding/decoding control section 11 encodes/compresses an image signal and decodes encoded/compressed image information back into an original image signal. The encoding/decoding control section 11 can handle encoding schemes generally used in facsimile communications, such as MH (Modified Hufman), MR (Modified READ) and MMR (Modified Modified READ).

The LAN control section 12 is for establishing a connection to an LAN (Local Area Network) to enable e-mail message exchanges and Internet facsimile communications over the Internet.

The modem 13 is for normal facsimile communications and constructed based on a facsimile modem capable of facsimile communications. The modem 13 is connected to a telephone line via a network control section (NCU, Network Control Unit) 14.

The network control section 14 is connected to a telephone line to control the line. The network control section 14 is hardware which implements the operation of closing and opening a line to an analog public switched telephone network (PSTN), connecting the modem 13 to the public switched telephone network where necessary.

The MDN transmission/reception control section 15 is for requesting an MDN, managing received results of MDN, etc. The MDN transmission/reception control section 15 operates as disposition notification controlling means, disposition specification controlling means, standby time setting means, and standby message count setting means to implement controls based on the header information added by the e-mail message composer section 7.

Besides, when the MDN transmission/reception control section 15 has received an MDN request from another machine, the MDN transmission/reception control section 15 recognizes the return transmission conditions in the request and, for example, monitors a time elapsed since the reception in collaboration with the clock section 16, counts the received e-mail messages, and composes processing conditions for an MDN to another machine, in accordance with the received return transmission conditions.

Here, the MDN transmission/reception control section 15 in embodiment 1 is adapted to use a time elapsed since the reception of an e-mail message as a return transmission condition for an MDN request.

The clock section 16 provides a means of monitoring elapsed time and constitutes disposition notification controlling means.

A facsimile/e-mail machine (network communication device) having the foregoing arrangement includes e-mail message composing means for composing an e-mail message and e-mail message transmitting/receiving means for transmitting/receiving an e-mail message. The e-mail message composing means has an MDN request incorporating function of incorporating an MDN request requesting an e-mail message MDN and return transmission conditions into a targeted e-mail message and a collective MDN response composing function of composing as a single e-mail message a collective MDN response which is a consolidation of MDN responses for multiple received e-mail messages. The e-mail message transmitting/receiving means has an MDN request recognizing function of recognizing an MDN request and return transmission conditions incorporated in a received e-mail message, and includes reception result monitoring means for monitoring whether an e-mail message is successfully received to compose an MDN response and disposition notification controlling means for monitoring that return transmission conditions incorporated into a received e-mail message are met, instructing, if return transmission conditions are met, the e-mail message composing means to compose a collective MDN response, and instructing the e-mail message transmitting/receiving means to transmit the composed collective MDN response.

Further, the network communication device provides the e-mail message transmitting/receiving means with an MDN transmitting function of transmitting a collective MDN response to a recipient address specified in a received e-mail message and a disposition specification control function of transmitting multiple MDN responses to a single specified recipient address in the form of a consolidated, collective MDN response, and is adapted so that the disposition specification control function specifies return transmission conditions for an MDN response based on return transmission conditions incorporated into a received e-mail message.

Figure 26:
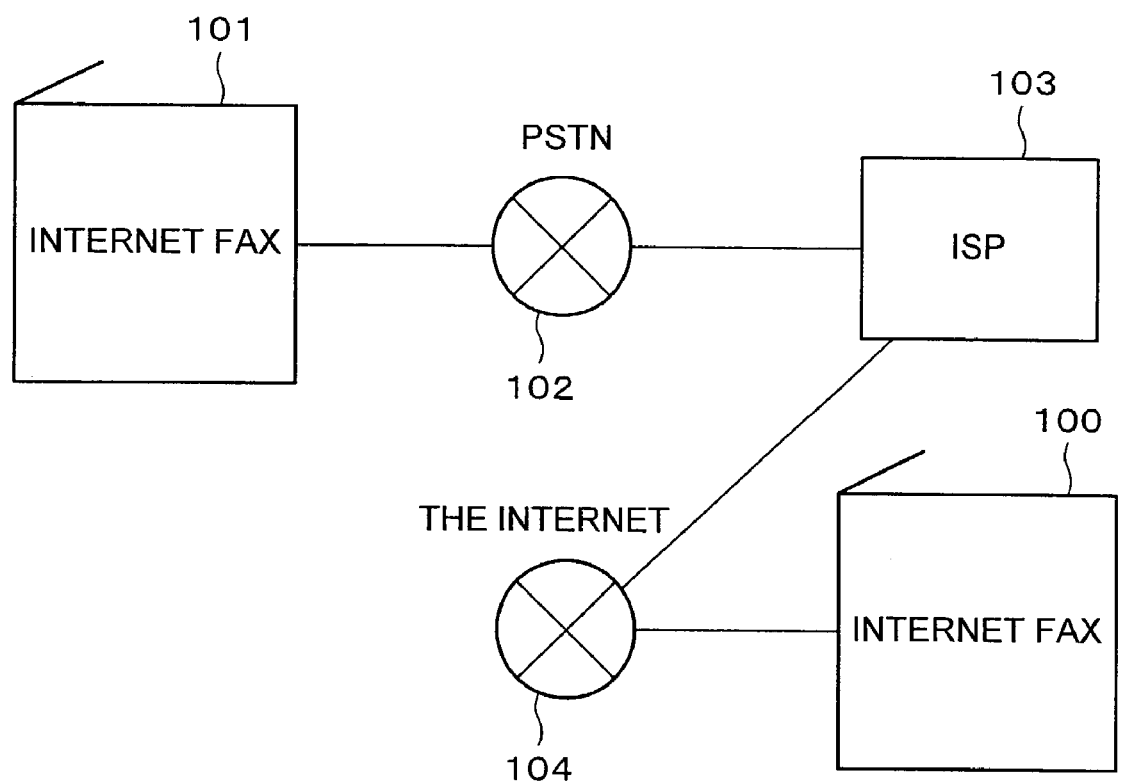
FIG. 26 is a block diagram illustrating the connection of an Internet fax.
Figure 27:
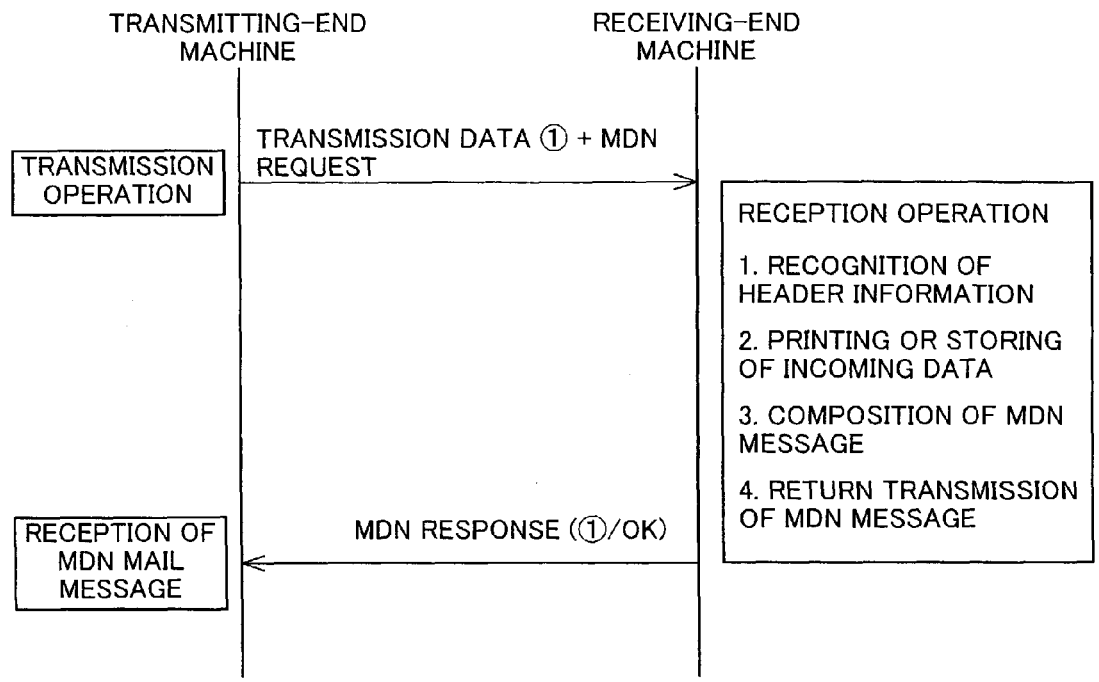
FIG. 27(a) and FIG. 27(b) are conceptual sketches showing MDN conventional disposition notification procedures, FIG. 27(a) illustrating a successful transmission/reception, FIG. 27(b) illustrating a failed transmission/reception.
Figure 27:
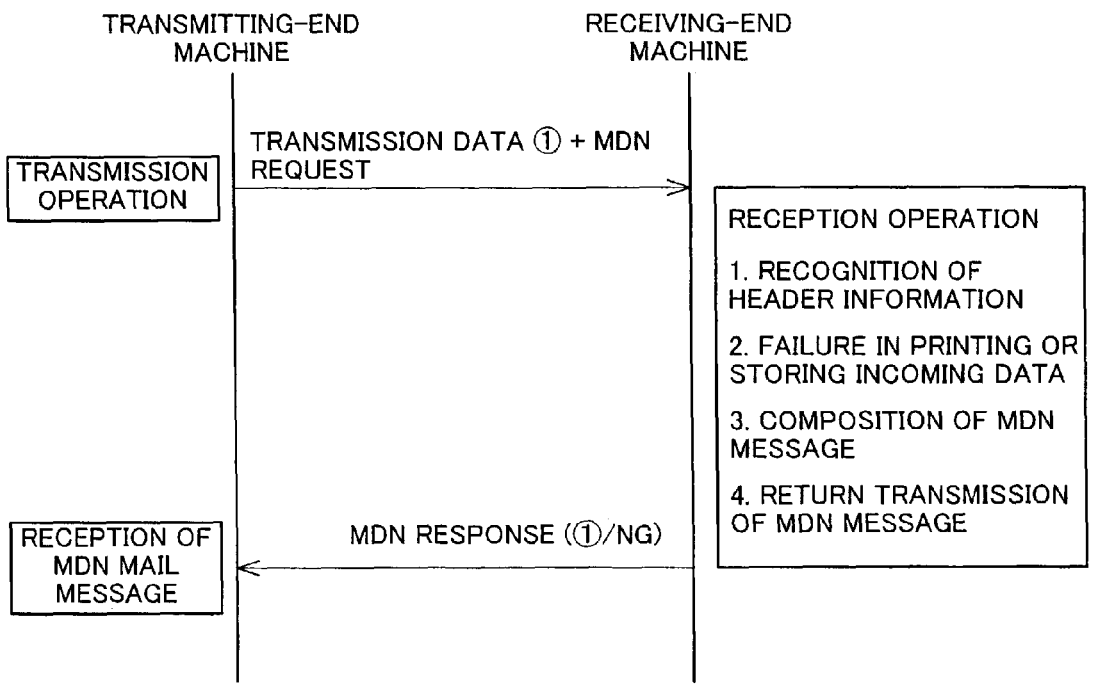
Figure 28:
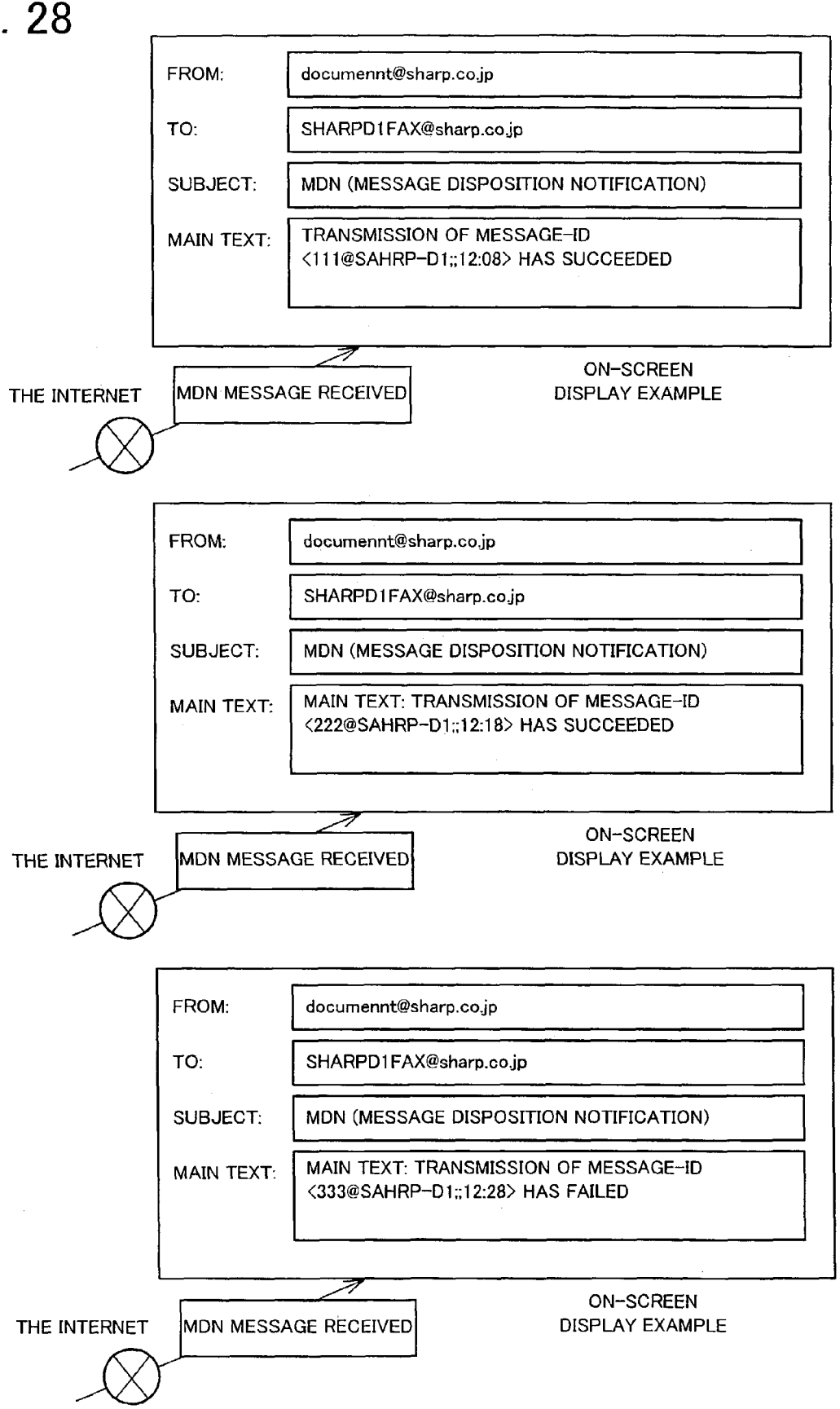
FIG. 28 shows the content of an MDN response message.

The facsimile/e-mail machine 1, having the foregoing arrangement, transmits/receives information to/from another facsimile/e-mail machine 1 connected to the Internet through e-mail as shown in, for example, FIG. 26.

E-mail message transmission/reception operation between facsimile/e-mail machines 1 having the arrangement will be described in reference to FIG. 2(*a*) and FIG. 2(*b*). Here will be described an Internet facsimile operation to transmit captured image data as an attachment to an e-mail message.

Figure 2:
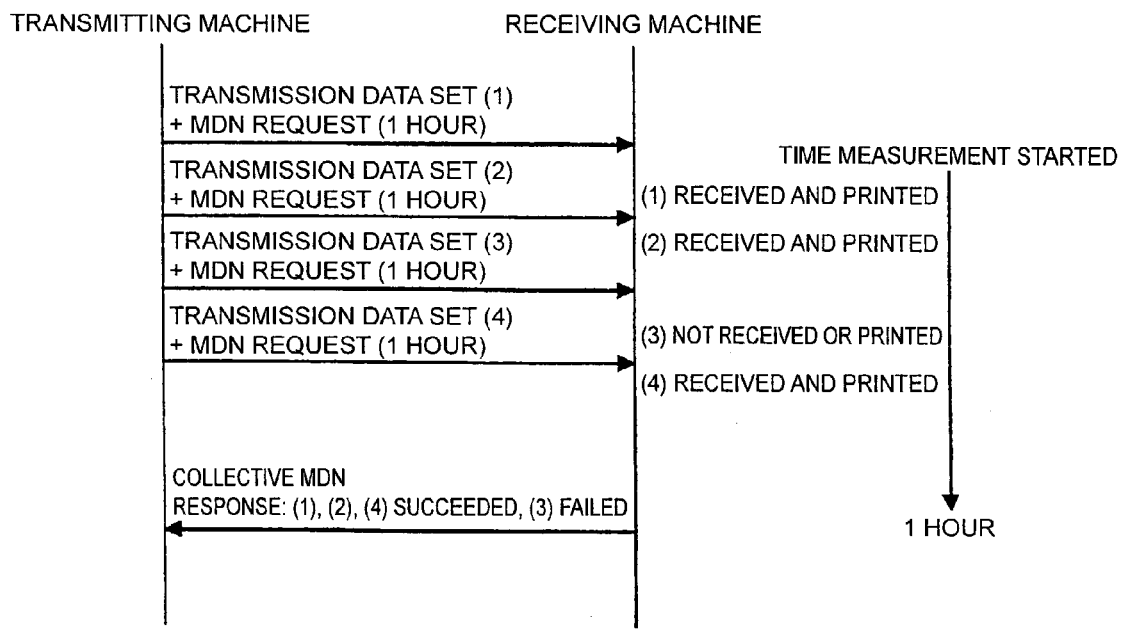
FIG. 2(a) and FIG. 2(b) depict a process related to an MDN response standby time in a first embodiment in accordance with the present invention.
Figure 2:
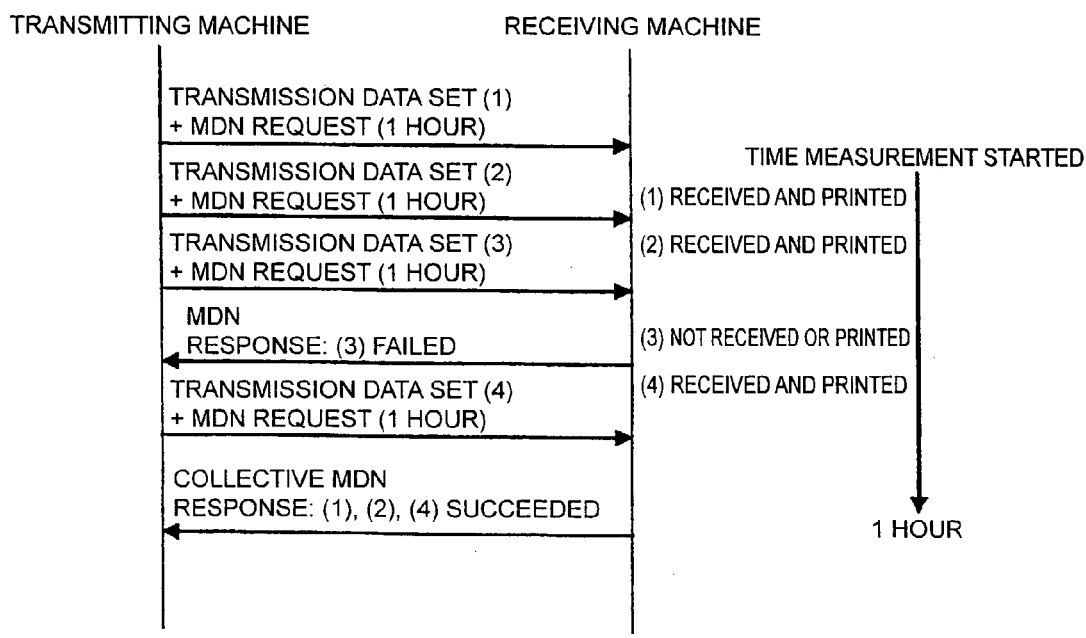
Figure 14:
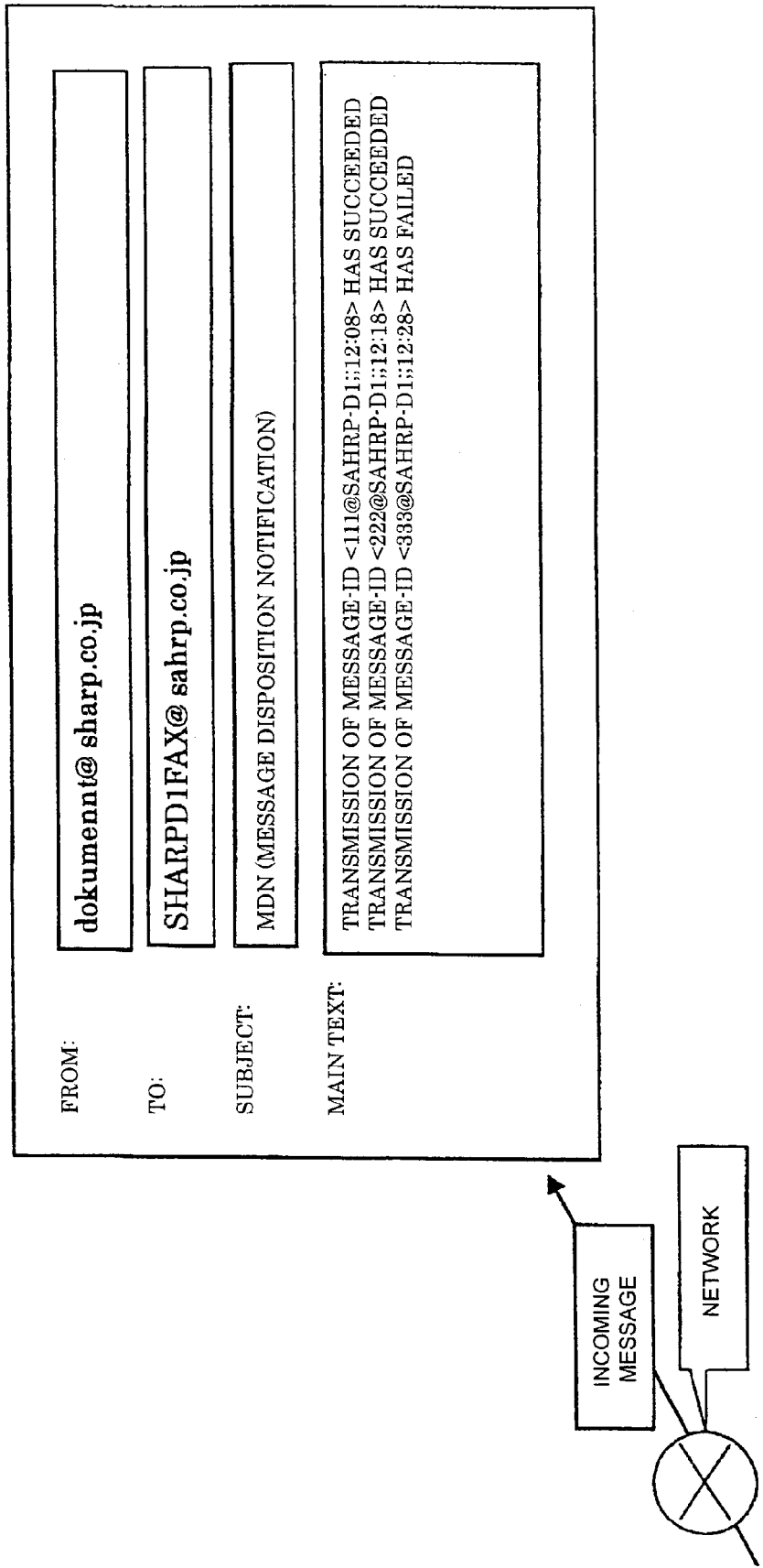
FIG. 14 shows a structure of a reception confirmation message (return message) in accordance with the present invention.

As shown in FIG. 2(*a*), MDN in embodiment 1 is arranged for the receiving end to, when receiving multiple e-mail messages (transmission data sets (1)-(4)) incorporating MDN requests transmitted from the transmitting end, return a collective MDN response as shown in FIG. 14 which is a consolidation of MDN responses corresponding to the transmission data sets (1)-(4).

First, when the transmitting machine transmits e-mail messages, it adds an MDN request field to the header of each e-mail message before transmission.

Figure 3:
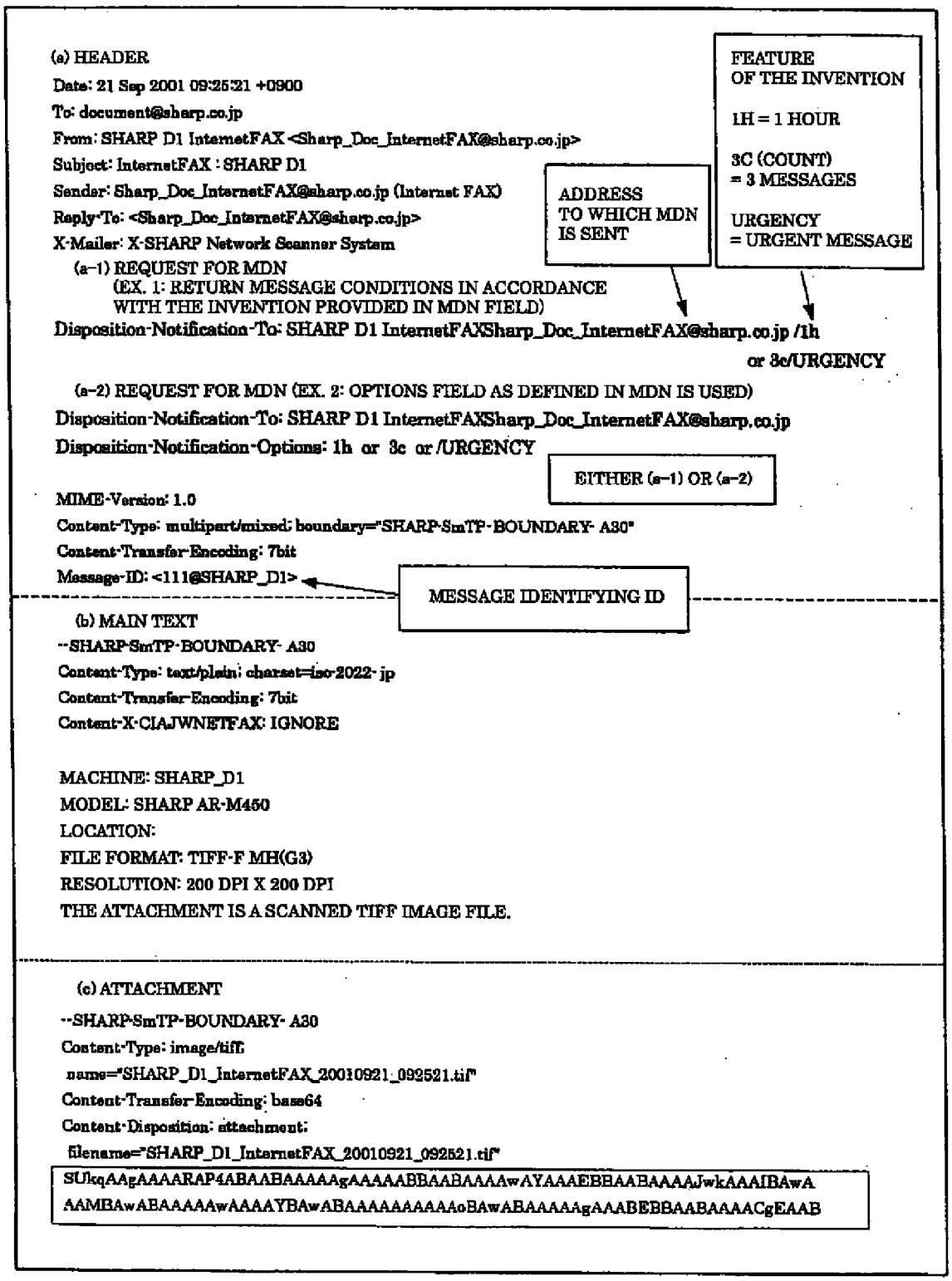
FIG. 3 is an example of a transmitted e-mail message.

Now, an example of an e-mail message transmitted in accordance with the present invention will be described in reference to FIG. 3. As shown in FIG. 3, an e-mail message is made up of a header (a), a main text (b), and an attachment (c). In actuality, the e-mail message is not divided into (a)-(c) or otherwise. For convenience of description, it is assumed here to be so divided.

The header (a) is an area to display information related to, for example, transmission/reception, as well as delivery over the Internet, of the e-mail message. Here, each line in the header describes a different, unique information for use in transmission/reception or another operation. Each line will be hereinafter referred to as a "field": for example, the "To" field shows the recipient address of the e-mail message, while the "From" field shows the sender address of the e-mail message.

Here, in embodiment 1, a transmission destination address and return transmission conditions are specified for an MDN e-mail message (collective MDN response) constituting an MDN request using a "Disposition-Notification-To" field (MDN field) defined by the MDN (RFC 2298) described in (a-1) in FIG. 3. That is, the MDN field shows "Sharp_Doc_InternetFAX@sharp.co.jp" as the recipient address to which an MDN e-mail message (collective MDN response) is to be returned.

Besides, a method of, upon the reception of an MDN, identifying the transmitted e-mail message for which the MDN is returned is provided by the transmitting end assigning a message-ID "111@SHARP D1" to an e-mail message to be transmitted upon the transmission of the e-mail message and transmitting it and the receiving end assigning the message-ID "111@SHARP D1" to the MDN response message and returning it.

The content in the main text (b) and the attachment (c) is of the kind actually found in typical e-mail messages, and detailed description thereof is omitted.

The content of description in the transmitted e-mail message, which is a feature of the present invention, will be described in more detail. Embodiment 1 has another feature that conditions (return transmission conditions) can be set for the returning of a collective MDN response in MDN after the Disposition-Notification-To field (MDN field) defined by the MDN (RFC 2298) in (a-1) in FIG. 3.

These return transmission conditions are "1 h" (1 hour) in embodiment 1 and "3 c" (3 messages) in embodiment 2 (detailed later). That is, the MDN field includes, as well as conventional description, additional information, such as a standby time and a message count, used for return a collective MDN response. The MDN field is composed by the e-mail message composer section 7 based on the information preset in the MDN transmission/reception control section 15.

Besides, the message-ID field gives an ID to distinguish between transmitted e-mail messages.

The conditions for the returning of a collective MDN response (return transmission conditions) may be set using the "Disposition-Notification-Options" field in (a-2) in FIG. 3.

Next, the aforementioned main text (b) constitutes the "body" of an e-mail message to transmit/receive text. Here, the present embodiment represents Internet facsimile communications and employs a main text (b) which is simple.

Besides, the attachment (c) is an encoded image file attached to the main text of the e-mail message. The attachment is specified to be formatted using MIME (Multipurpose Internet Mail Extensions).

The e-mail message formatted as in the foregoing is transmitted as four different data sets of an original document image as shown in FIG. 2(*a*): a transmission data set (1), a transmission data set (2), a transmission data set (3), and a transmission data set (4).

Meanwhile, in the receiving-end facsimile/e-mail machine 1, the MDN transmission/reception control section 15 is adapted to analyze the header in the received e-mail message and confirm return transmission conditions. That is, in embodiment 1, on the basis of the additional time setting information in the MDN field, a return message is scheduled to be sent 1 hour later. The MDN transmission/reception control section 15 is adapted to monitor an elapsed time in collaboration with the clock section 16 and sends a return message at the predetermined time.

Details of the MDN consolidating process at the receiving end will be described in reference to FIG. 4 which will be described later.

Referring to FIG. 2(*b*), if an e-mail message is transmitted as three different data sets (a transmission data set (1), a transmission data set (IFAx 2), and a transmission data set (3)) of an original document image, and the transmission data set (3) is not successfully printed, the following operation is implemented. First, a separate MDN response is returned only for the transmission data set (IFAX 3) which has not successfully received (printed). Upon the reception of this response, the transmitting machine transmits a data set (4) (a retransmission of the data set (3)). If the receiving machine has succeeded in the receiving and printing of the transmission data set (4), a collective MDN response is returned indicating that the transmission data sets (1), (2), and (4) have been successfully printed.

Next, the management of received e-mail messages in the aforementioned receiving-end facsimile/e-mail machine 1 in FIG. 2 will be described on the basis of the flow chart in FIG. 4. Description of network communications will be omitted here.

When a receiving-end communication device (receiving machine) receives data (e-mail message) transmitted from a transmitting-end communication device (transmitting machine) (step S1), if, for example, the machine main body in the receiving-end facsimile/e-mail machine 1 is specified to send a return message after printing, the machine 1 prints the reception data.

This allows post-print determination of the state of a print output from the receiving-end machine: for example, the reception data is illegible due to data transmission trouble or unknown compression method, or is not printed due to inoperative print function. The determined state of the print output is stored (step S2).

Next, it is determined whether the header of the received e-mail message has an MDN request in its MDN field (step S3). If there exists no MDN request, the e-mail reception operation is ended, and the machine 1 enters a normal standby state (step S8).

If the result determined in step S3 indicates that there exists an MDN request, it is determined whether that MDN request includes a collective return message designation and also whether the aforementioned result indicates a successful reception (print output) (step S4). If the request includes no collective return message designation or the result indicates a failed reception, a separate MDN response (NG) is returned in reply to the MDN request (step S6), and the operation proceeds to step S8.

If step S4 has found a collective return message designation, it is determined whether there is/are already a separate MDN response(s) in standby for which a collective return message designation is given (step S5).

If step S5 determines that there is no separate MDN response in standby for which a collective return message designation is given, return message conditions, for example, in how many hours a return message will be sent, are stored, and time measurement is started up to that time (step S7). The operation then proceeds to step S8.

Next, it is determined whether the return message standby time has elapsed (step S8).

If step S8 determines that standby time has not elapsed, it is determined whether there is new reception data (step S9). If there is no new reception data, the operation returns to step S8. If there is new reception data, the operation returns to step S1.

If step S8 determines that the return message standby time has elapsed, a collective MDN response which is a consolidation of MDN responses for respective reception data sets is returned (step S10).

Next, it is determined whether there is any data remaining to be transmitted (step S11). Step 11 is provided here because if all the transmission data sets, for which conditions are specified individually, do not share identical conditions, there likely remains data to be transmitted (if they share identical conditions, there remains no data to be transmitted). If there remains data, the operation returns to step S8. If there remains no data, the operation is ended.

The described process enables a collective MDN response which is a consolidation of MDN responses to be returned from the receiving end to the recipient address specified in the MDN request. That is, for example, as shown in FIG. 2, the receiving-end facsimile/e-mail machine 1 can perform the aforementioned operation on e-mail message transmissions and MDN requests, so as to send no more than a single MDN in reply to multiple MDN requests.

Figure 4:
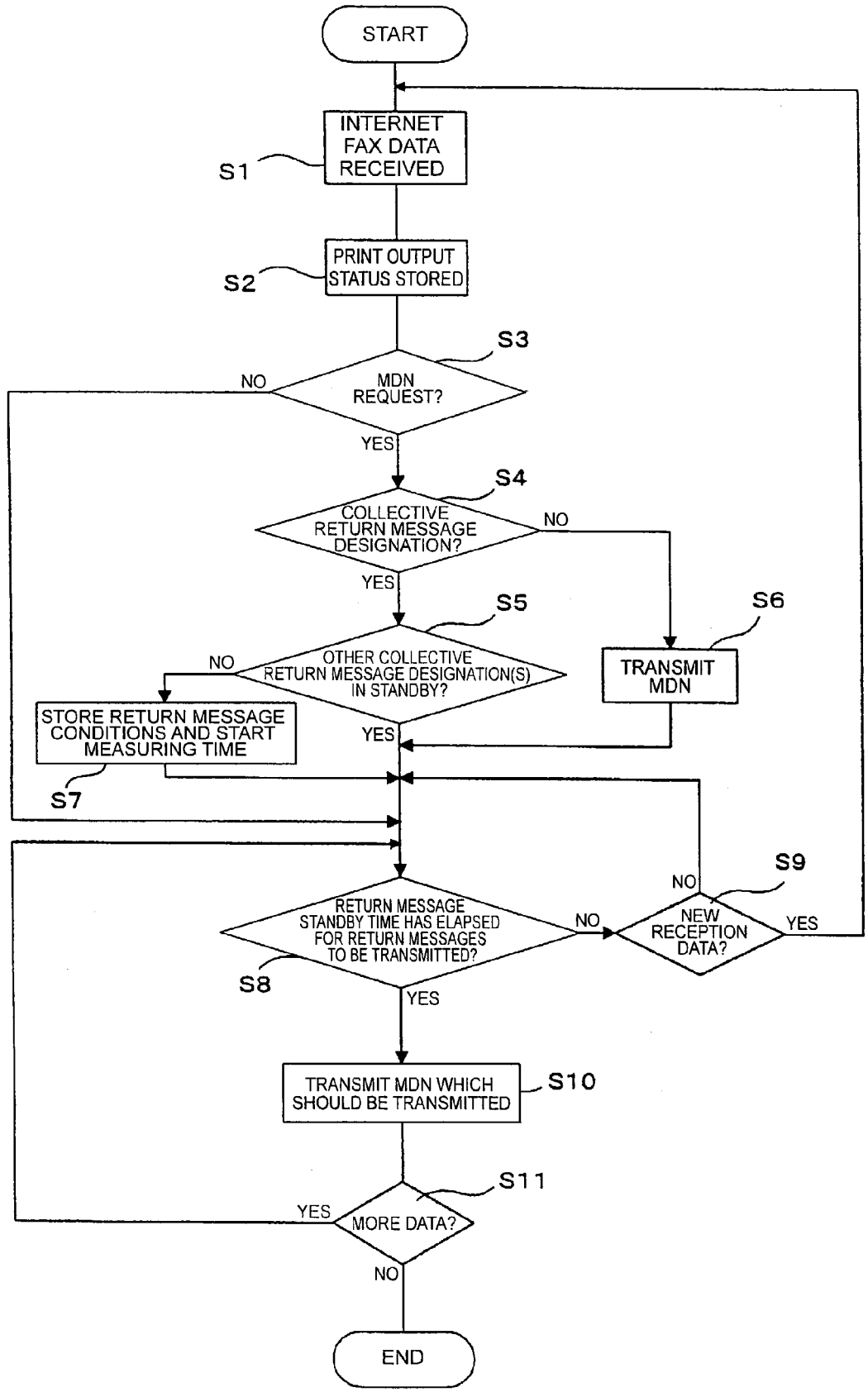
FIG. 4 illustrates a flow of an MDN response process in the first embodiment.

FIG. 4 describes in the flow chart that an MDN response is returned after a printing process. The response may however be returned before the printing process.

Besides, even when predetermined return transmission conditions are not reached, by arranging so that a response is returned immediately in the case of a printing error even if return transmission conditions are not met, for example, the transmitting end can detect the error at the receiving end and immediately transmit next data to reduce a standby time.

Besides, failed cases may be either included or excluded from the counting of predetermined conditions being reached.

Now, an example of an e-mail message (MDN response) returned from the receiving-end facsimile/e-mail machine in the MDN will be described in reference to FIG. 5. A return e-mail message is made up of a header (a), a main text (b), and MDN information (c). In actuality, the e-mail message is not divided into (a)-(c) or otherwise. For convenience of description, it is assumed here to be so divided.

Here, the header (a) and the main text (b) are the same as those in the aforementioned transmitted message shown in FIG. 3. Note however that in FIG. 5 the main text (b) gives an error description.

The content of the description in a received e-mail message, which constitutes a feature of the present invention, will be described. MDN result information (c) is information used for MDN. For example, the field part A shown in the figure shows the following information. The "Final-Recipient" field at the top gives the address of the recipient of an MDN response to an MDN request. The "Original-Message-ID" field in the middle gives an ID identifying an e-mail message. The field is used, for example, to indicate that this is an MDN response corresponding to the message-ID field in the header (a) in FIG. 3. Conventionally, only one message-ID was given; in the present invention, multiple message-IDs are given to enable collective return response.

The "Disposition" field at the bottom shows "Process Succeeded," "Process Failed," and other status of individual messages corresponding to the message-IDs.

In FIG. 5, the MDN result information (c) shows that the process has been successful for the message-IDs (3 messages) given in "Original-Message-ID" in the middle.

Figure 6:
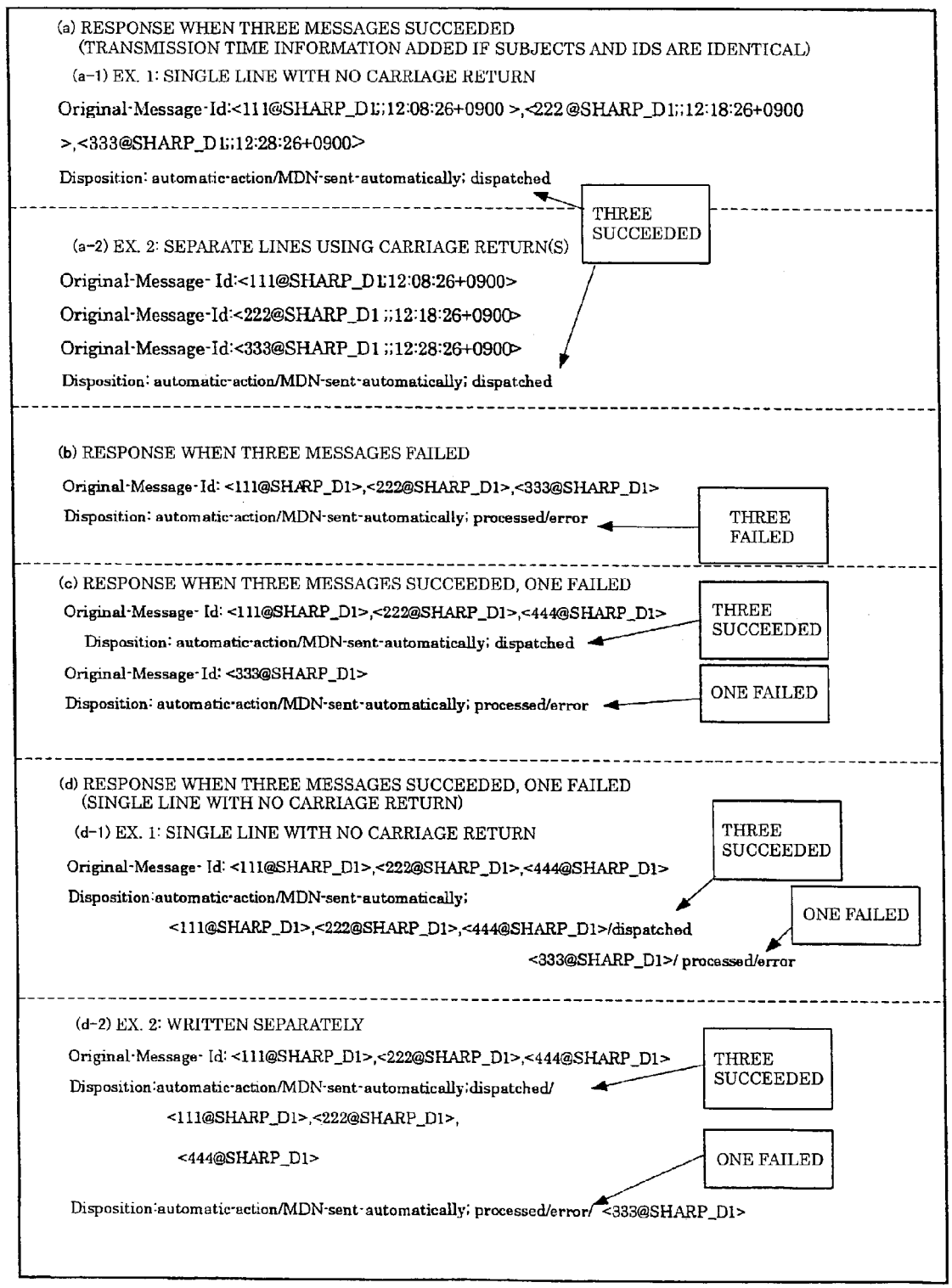
FIG. 6 is an example of a response message from the receiving end for an MDN request (another example of result information).

Here, another method of notifying of a reception result may be provided using the field part A in FIG. 6, in place of the field part A in the MDN result information (c) in FIG. 5.

That is, if, for example, the process has failed, "processed/error" is written as shown in (b) in FIG. 6, which indicates that the process has failed.

Besides, if 3 messages has succeeded, and one has failed, separate "success" and "failure" descriptions may be given as shown in (c) in FIG. 6. Alternatively, both descriptions may be given in one line as shown in (d) in FIG. 6.

As in the foregoing, as the facsimile/e-mail machine 1 in accordance with the present embodiment receives an e-mail message containing an MDN request, it recognizes the MDN request, confirms the return transmission conditions specified in terms of time, and composes a collective MDN response which is a consolidation of multiple MDN responses in accordance with those return transmission conditions for a return transmission. Therefore, even when, for example, multiple e-mail messages are transmitted successively as in the foregoing, it is sufficient if a single MDN response transmission is returned.

Note that the present invention is not limited to the embodiment above: the collective MDN response message may describe the time of reception of each message as, for example, MDN information given in the MDN result information (c) in FIG. 5, so as to distinguish between messages containing the same message-ID field as shown in (a-1) and (a-2) in FIG. 6.

Besides, the embodiment so far has illustrated an arrangement in which the receiving end operates based on the header information given by the transmitting end and returns a collective MDN response which is a consolidation of multiple MDNs, which is by no means not restricting the present invention. For example, the receiving end may consolidate multiple MDNs into a single confirmation which is then returned, without using the return transmission conditions specified in the "Disposition-Notification-To:" field in (a) in FIG. 3.

This is achieved by, for example, interpreting the MDN request and the collective return message designation confirmed in step S3 and step S4 shown in FIG. 4 as indicating a confirmation of the receiving-end settings. When this is the case, effects similar to those in the previous cases can be achieved.

Embodiment 2

Figure 7:
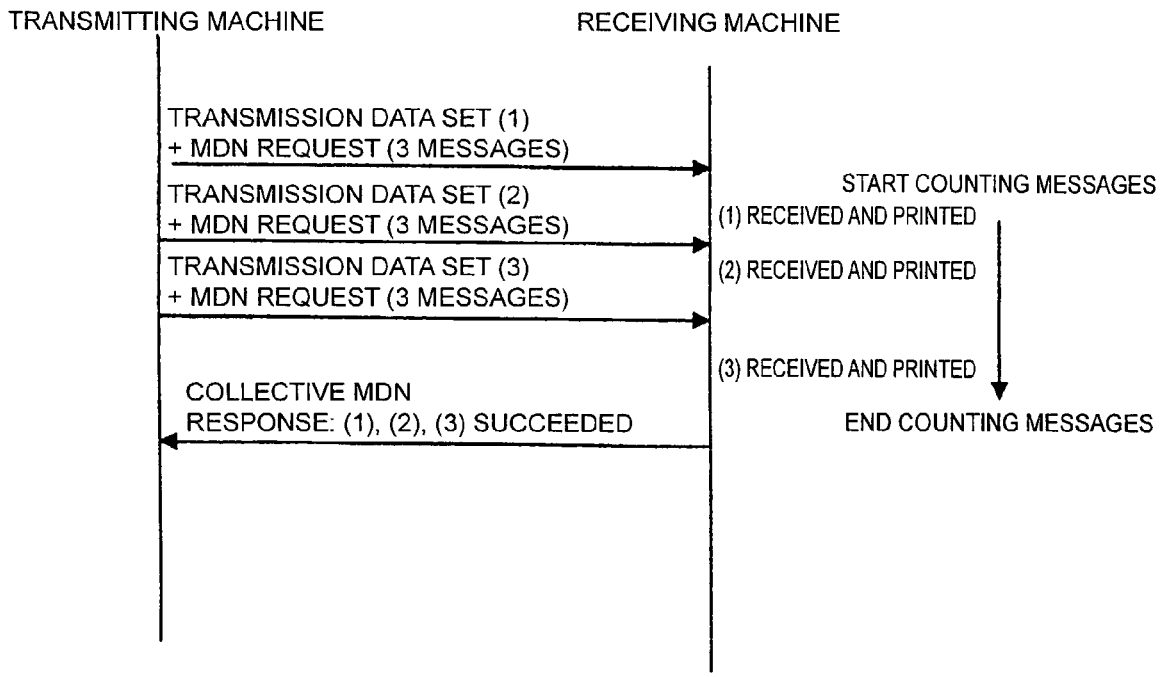
FIG. 7(a) and FIG. 7(b) depict a process related to an MDN response standby message count in a second embodiment in accordance with the present invention.
Figure 7:
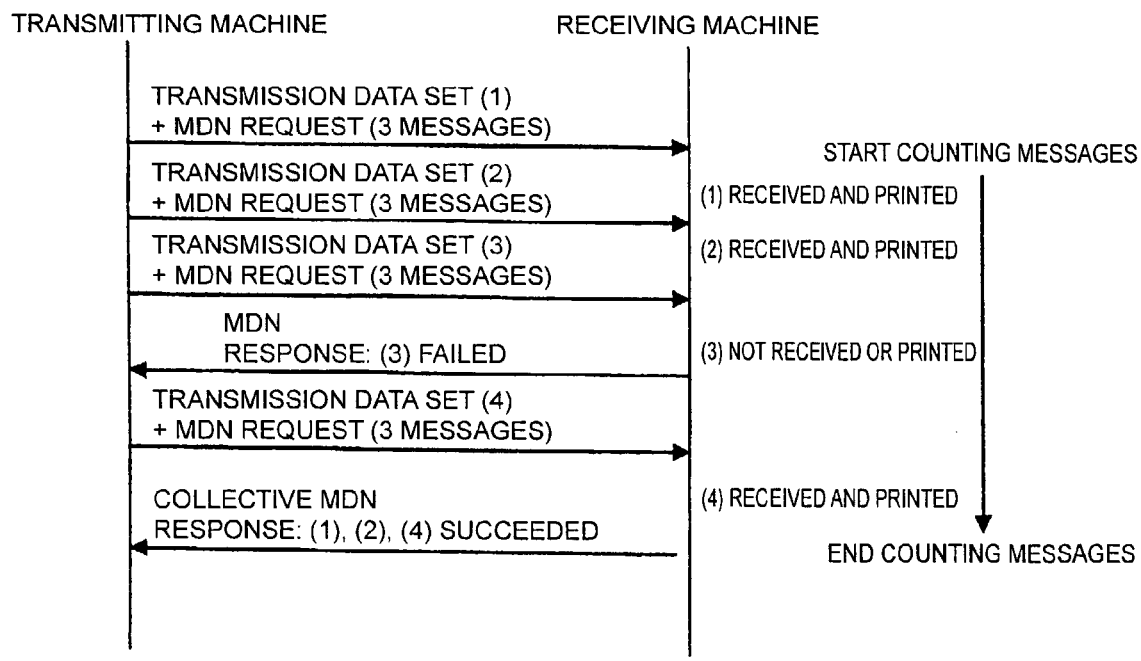

A facsimile/e-mail machine 1 in accordance with the present invention is not limited to the aforementioned embodiment, and may operate as follows. Embodiment 2 in accordance with the present invention will be described in reference to FIG. 7 and FIG. 8.

The facsimile/e-mail machine 1 of embodiment 2 differs from the facsimile/e-mail machine 1 of embodiment 1 only in the arrangement and operation of the MDN transmission/reception control section 15. Accordingly, the following will describe only those differences.

The MDN transmission/reception control section 15 of embodiment 2 is, similarly to that of embodiment 1, to make an MDN request, manage received results of MDNs, etc. In embodiment 2, the count of transmitted e-mail messages is used as return transmission conditions incorporated into the MDN request.

The transmission/reception operation of e-mail messages between facsimile/e-mail machine 1 having such an arrangement will be described in reference to FIG. 7(a) and FIG. 7(b).

As shown in FIG. 7(a), in an MDN of the present embodiment, similarly to embodiment 1, a collective MDN response which is a consolidation of MDN responses is returned from a receiving end in reply to multiple e-mail messages (transmission data set (1), (2), (3)) transmitted from the transmitting end.

That is, the facsimile/e-mail machine 1 at the transmitting end transmits data of three different original document images, i.e., a transmission data set (1), a transmission data set (2), and a transmission data set (3), as individual e-mail messages each containing an MDN field describing an MDN request and return transmission conditions (the count 3 of messages to be consolidated).

Meanwhile, at the receiving-end facsimile/e-mail machine 1, the MDN transmission/reception control section 15 is adapted to analyze the header of the received e-mail message to confirm return transmission conditions. That is, in embodiment 2, a return message is sent after completing the printing of a specified number of messages on the basis of the message count information which is return transmission conditions added to the MDN field.

Then, the main control section 3 monitors the state of the e-mail message count. When the specified message count is reached, an MDN is returned.

Besides, as shown in FIG. 7(b), when data of three different original document images, i.e., the transmission data set (1), the transmission data set (2), and the transmission data set (3), are transmitted in the form of individual e-mail messages, with the transmission data set (3) not successfully printed, an operation is performed as follows.

First, a separate MDN response (NG) is returned identifying the unsuccessful transmission data set (3). The transmitting machine receiving this transmits a transmission data set (4) which is a retransmission of the transmission data set (3). If the receiving machine receiving the transmission data set (4) successfully prints the transmission data set (4), a collective MDN response is return indicating successful printing of the transmission data sets (1), (2), and (4).

A determination process at the receiving end to perform the foregoing operation will be described in reference to FIG. 8. The determination process is substantially the same to the determination process illustrated in FIG. 4; the following will describe those steps which differ from FIG. 4 in detail.

First, the e-mail message received from a transmitting-end communication device is printed by receiving-end communication device (step S21) and the status of a result of printing is stored (step S22). Next, it is determined whether there is an MDN request (step S23). If there is no MDN request, the operation proceeds to step S28.

If it is determined in step S23 that there is an MDN request, it is then determined whether the MDN request contains a collective return message designation and also whether the aforementioned result of receiving (result of printing) indicates a success (step S24). Here, if there is included no collective return message designation, an MDN response to the MDN request is returned (step S26), and the operation proceeds to step S28. Besides, if the result of receiving (result of printing) is not successful, a separate MDN response (NG) to the MDN request is returned (step S26), and the operation proceeds to step S28.

If it is determined in step S24 that there is included a collective return message designation, it is then determined whether there is already an MDN response with a collective return message designation in standby(step S25). If there is no MDN response with a collective return message designation in standby, for example, return transmission conditions for a return transmission, such as how many messages must be received before a return transmission, are stored (step S27), and the operation proceeds to step S28.

Subsequently, it is determined whether the received message count has reached the message count conditions (step S28). If the message count conditions have not been reached yet, it is determined whether there is new reception data (step S29). If there is no new reception data, the operation returns to step S28. If there is new reception data, the operation returns to step S21.

If the message count conditions have been reached in step S28, a collective MDN response is composed for the message count conditions and transmitted to the transmitting end communication device (step S30).

Next, it is determine whether there remains any data to be transmitted (step S31). If there remains any data, the operation returns to step S28. If there remains no data, the process is terminated.

The process enables a message to be sent to the recipient address specified in the MDN request. As in the foregoing, upon reception of an e-mail message containing an MDN request, the facsimile/e-mail machine 1 of embodiment 2 recognizes the MDN request to confirm the return transmission conditions specified by the number of transmitted e-mail messages, and composes a collective MDN response by consolidating multiple MDN responses in accordance with the return transmission conditions for a return transmission. Therefore, for example, even when multiple e-mail messages are successively transmitted as in the foregoing, it is sufficient if a single MDN response transmission is returned.

Besides, by arranging so that a response is returned immediately in the case of a printing error even if return transmission conditions are not met, for example, the transmitting end can detect the error at the receiving end and immediately transmit next data to reduce a standby time.

Besides, failed cases may be either included or excluded from the counting of predetermined conditions being reached.

Embodiment 3

The facsimile/e-mail machine 1 in accordance with the present invention is not limited to embodiments 1 and 2, and may operate in the following. That is, a facsimile/e-mail machine 1 of embodiment 3 determines not only by using the count of transmitted e-mail messages as return transmission conditions for an MDN response to an MDN request, but also by using a time elapsed after reception of an e-mail message.

Figure 9:
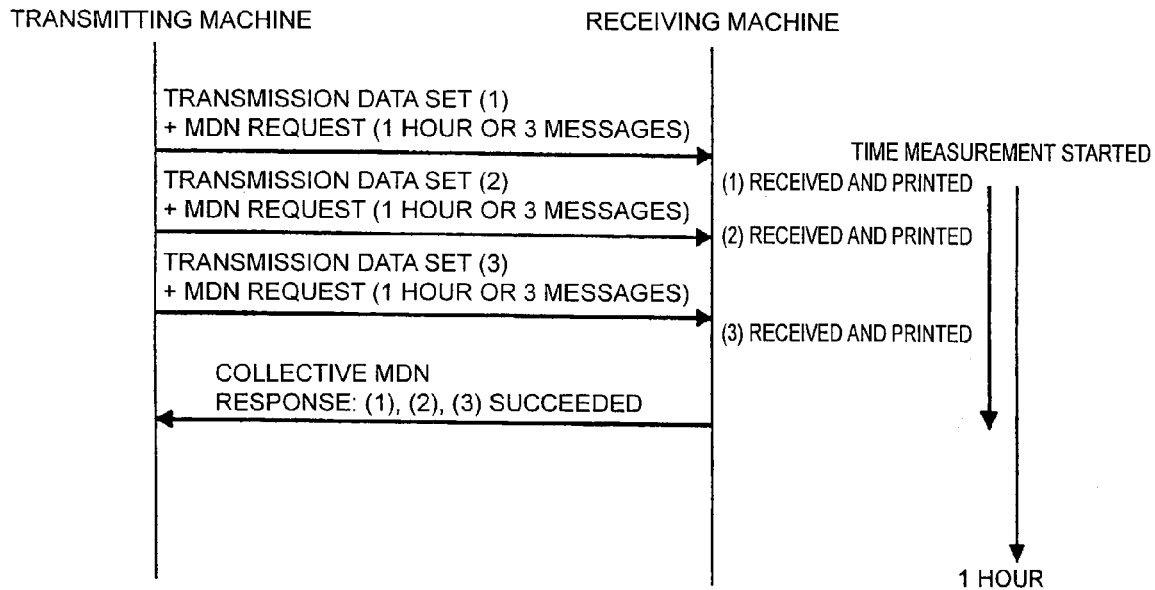
FIG. 9(a) and FIG. 9(b) depict a process related to an MDN response standby time+a message count in a third embodiment in accordance with the present invention.
Figure 9:
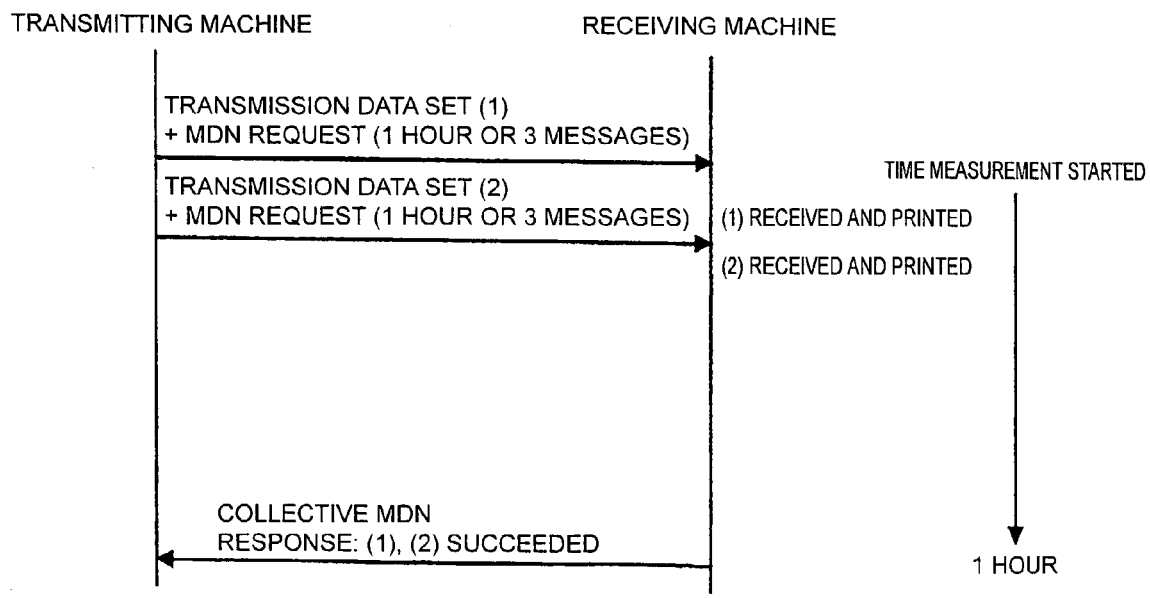

As shown in FIG. 9(*a*), in an MDN of embodiment 3, similarly to the aforementioned embodiment, a collective MDN response which is a consolidation of multiple MDN responses is returned from the receiving end in reply to multiple e-mail messages (transmission data set (1), (2), (3)) transmitted from the transmitting end.

That is, the transmitting end transmits data of three different original document images, i.e., a transmission data set (1), a transmission data set (2), and a transmission data set (3), as individual e-mail messages each containing an MDN field.

Here, as to the transmission data set (1), the transmission data set (2), and the transmission data set (3), the return transmission conditions are specified so that a return message is sent if either of the conditions is satisfied: 1 hour has elapsed after the reception of an e-mail message or the count of e-mail messages received has reached three.

In the receiving-end facsimile/e-mail machine 1, the MDN transmission/reception control section 15 analyzes the header of the received e-mail message to confirm return transmission conditions. That is, in embodiment 3, a collective MDN response is composed and returned after completing the printing of a specified number of messages on the basis of the message count information added to the MDN field. Then, the main control section 3 monitors the state of the e-mail message count. When the predetermined message count is reached, a collective MDN response is returned.

Here, for example, as shown in FIG. 9(*a*), if the three messages, i.e., the transmission data set (1), the transmission data set (2), and the transmission data set (3), are completely received and printed before the expiration of 1 hour, a collective MDN response is returned which is a consolidation of confirmations of transmissions of the transmission data set (1), the transmission data set (2), and the transmission data set (3).

Besides, as shown in FIG. 9(*b*), if 1 hour has expired after the reception of the transmission data set (1) and the transmission data set (2), and before the reception of the transmission data set (3), a collective MDN response which is a consolidation of transmission confirmations for the transmission data set (1) and the transmission data set (2) up to that moment is returned.

Figure 8:
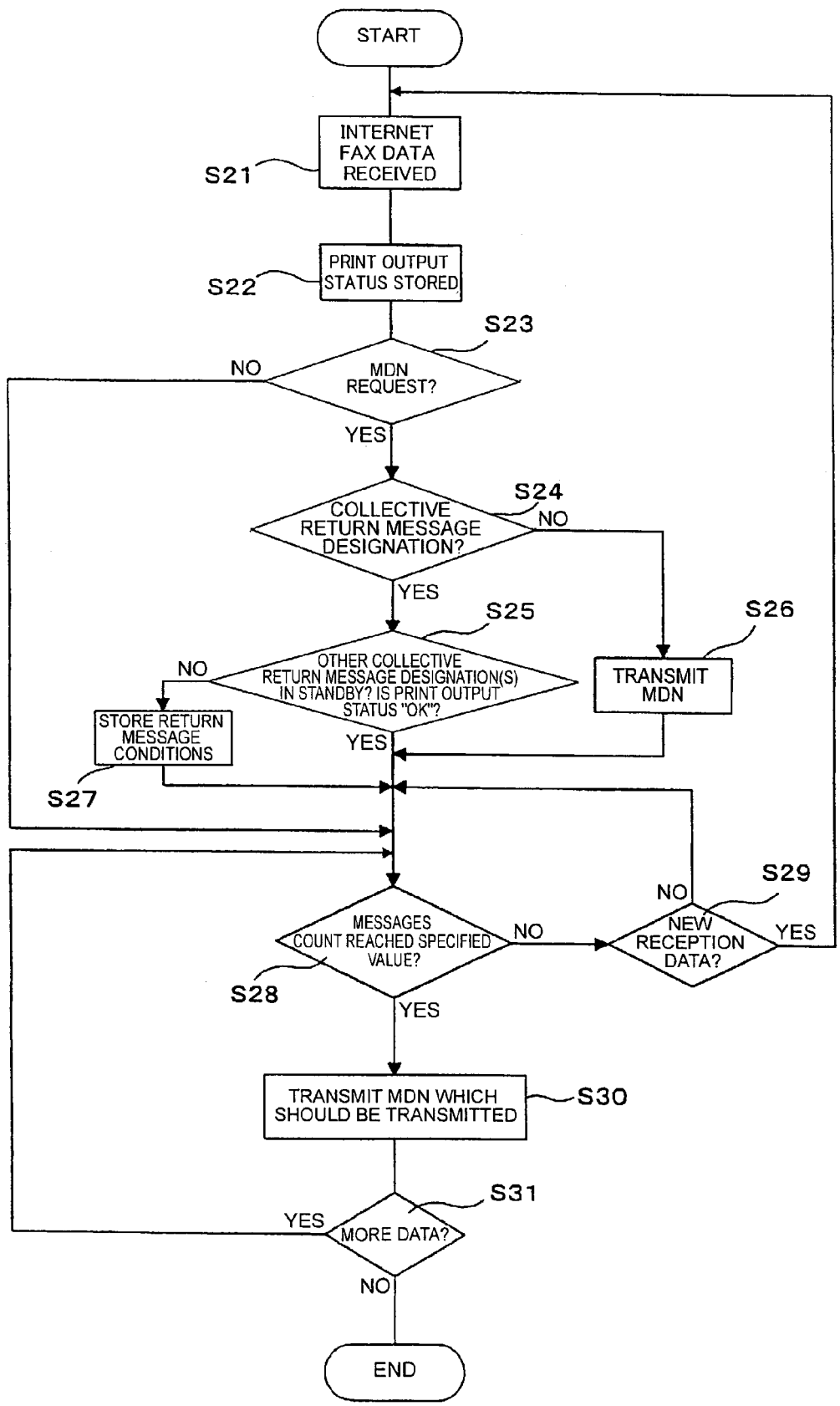
FIG. 8 is a flow chart illustrating a flow of a determination process (message count) at the receiving end in embodiment 2 in accordance with the present invention.

When this is the case, a determination process at the receiving end can be provided by combining the processes in FIG. 4 and FIG. 8 above so as to determine in step S28 whether a return message standby time has elapsed too.

As the foregoing, the facsimile/e-mail machine 1 of the present embodiment is arranged to use, as return transmission conditions, the return transmission conditions specified by the number of transmitted e-mail messages, as well as those specified by the time elapsed since the reception of transmit e-mail messages.

Therefore, an MDN can be received at the transmitting end more quickly and surely than when the return transmission conditions specified by the number of transmitted e-mail messages or those specified by the time elapsed since the reception of transmit e-mail messages are employed as return transmission conditions. Therefore, the standby time can be reduced at the transmitting end.

Embodiment 4

A facsimile/e-mail machine 1 in accordance with the present invention is not limited to the embodiments, and may operate as follows. That is, if the return transmission conditions designate an urgent process (urgency), the process is implemented before other processes.

Figure 10:
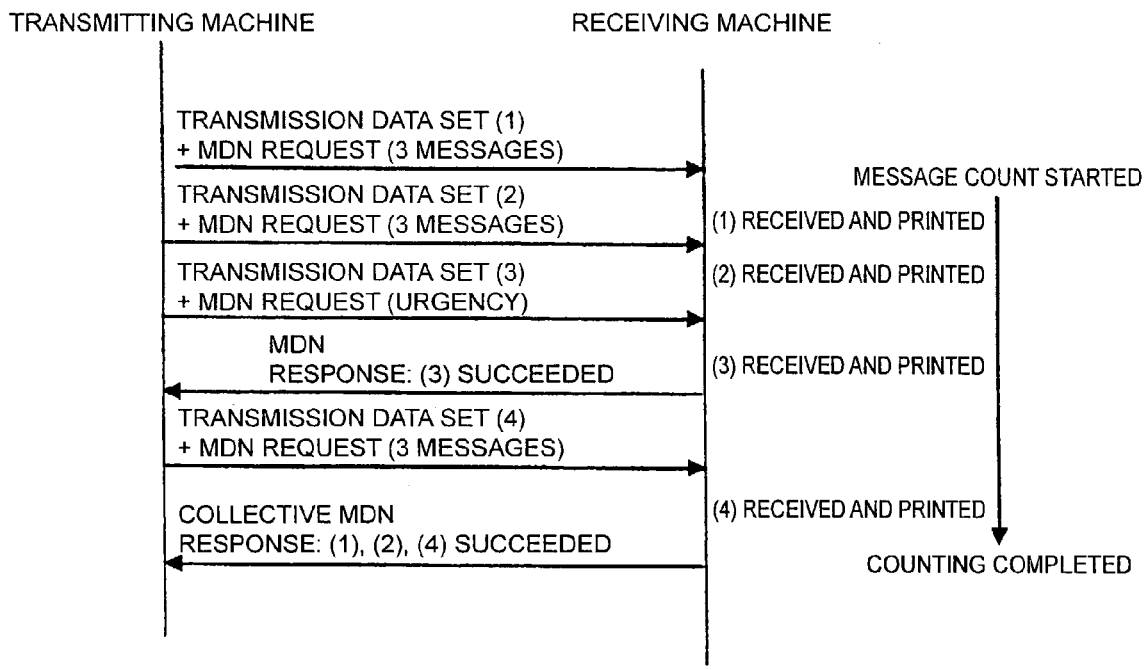
FIG. 10(a) and FIG. 10(b) depict a process (urgency) related to an MDN response standby message count in a fourth embodiment in accordance with the present invention.
Figure 10:
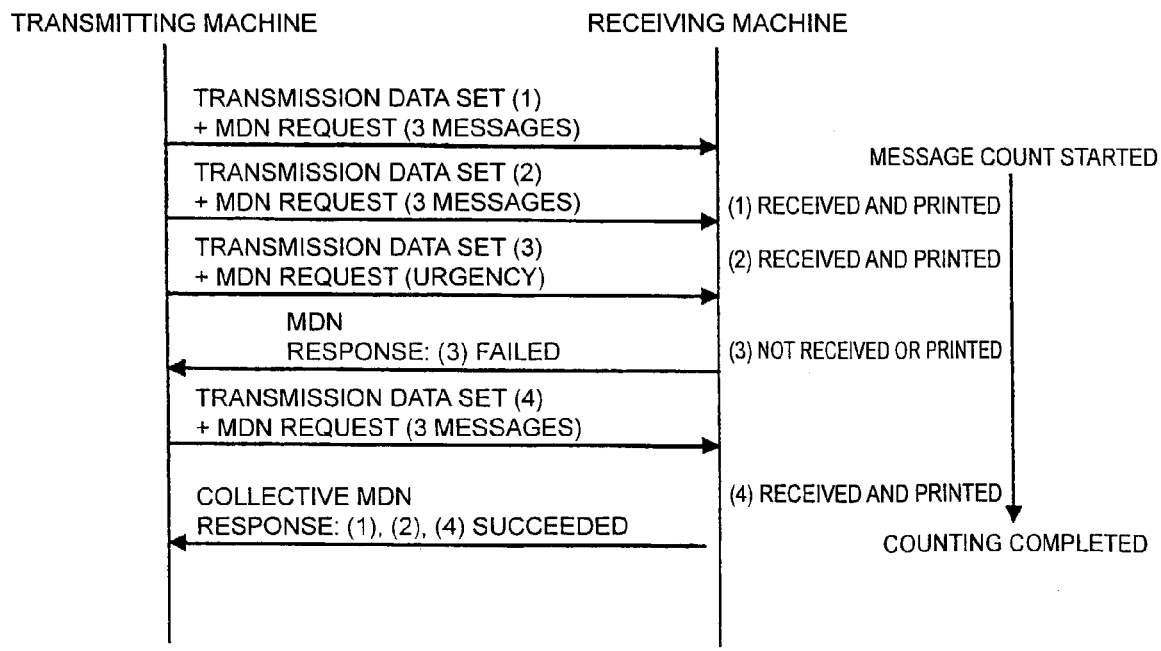

As shown in FIG. 10(*a*), in an MDN of embodiment 4, a collective MDN response which is a consolidation of MDN responses to multiple e-mail messages transmitted from the transmitting end is returned from the receiving end similarly to the aforementioned embodiment.

That is, the transmitting end transmits data of three different original document images, i.e., a transmission data set (1), a transmission data set (2), and a transmission data set (3), as individual e-mail messages each containing an MDN field.

Here, for the transmission data set (1) and the transmission data set (2), the return transmission conditions are specified by an e-mail message count (3 messages). For the transmission data set (3), the return transmission conditions designate an urgent MDN request (urgency).

In the receiving-end facsimile/e-mail machine 1, the MDN transmission/reception control section 15 analyzes the header in a received e-mail message to confirm return transmission conditions. That is, in embodiment 4, a return message is sent on the basis of the message count information given in the MDN field after the number of printed messages reaches the specified message count. The main control section 3 monitors the state of the message count and sends a return message in a predetermined state.

Here, as in the foregoing, the return transmission conditions of the transmission data set (3) designate an urgent MDN request (urgency); therefore, as to the transmission data set (3), a separate MDN response is immediately returned once the printing is completed.

Thereafter, as the transmission data set (4) is received and printed, a collective MDN response which is a consolidation of MDN responses to the respective transmission data sets (1), (2), and (4) is returned on the basis of the return transmission conditions specified by the aforementioned receive message count.

Besides, as shown in FIG. 10(*b*), when data of three different original document images, i.e., the transmission data sets (1), the transmission data set (2), and the transmission data set (3), are transmitted in the form of individual e-mail messages, with the transmission data set (3) not successfully printed, an operation is performed as follows. That is, an MDN response ((3) NG) is returned first only in reply to the transmission data set (3) which has not been successfully printed. The transmitting machine receiving this transmits a transmission data set (4) (a retransmission process of the transmission data set (3)).

When the receiving machine receiving the transmission data set (4) successfully prints the transmission data set (4), a collective MDN response which is a consolidation of MDN responses is returned indicating successful printing of the transmission data sets (1), (2), and (4).

When this is the case, a determination process at the receiving end can be provided by, for example, further determining in the step S24 in FIG. 8 described earlier whether an urgent process is designated. Besides, if the MDN response (NG) when the printing is unsuccessful is not limited to the case of the transmission data set (3) for which the return transmission conditions designates an urgent MDN request (urgency). Even in the case where the return transmission conditions are specified by the message count (3 e-mail messages) (for example, the transmission data set (IFAX 2)), when the printing is unsuccessful, the same data as the transmission data set (2) can be retransmitted from the transmitting machine as transmission data set (3) by returning an MDN response (NG) without waiting for the return transmission conditions to be met. If the transmission data set (3) has return transmission conditions designating an urgent MDN request (urgency), an MDN response is returned immediately following a success print of the transmission data set (3).

As in the foregoing, having received an e-mail message containing an urgent MDN request, the facsimile/e-mail machine 1 of embodiment 4 recognizes an MDN request to confirm "urgent" return transmission conditions and immediately returns an MDN in accordance with the return transmission conditions. Therefore, even when multiple e-mail messages are successively transmitted, the transmitting end can immediately receive an MDN response for an urgent message. Therefore, a response confirmation for a transmission requiring a quick MDN can be received with a reduced standby time and processed efficiently.

Embodiment 5

Figure 11:
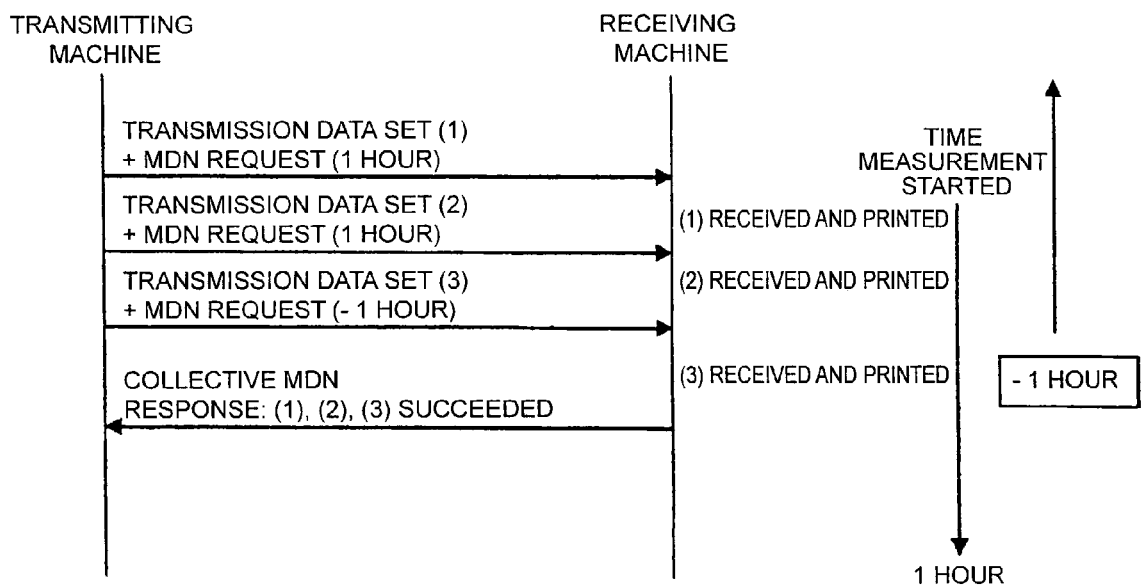
FIG. 11(a) and FIG. 11(b) depict a process of changing an MDN response standby time (decreasing or otherwise varying an elapsed time) in a fifth embodiment in accordance with the present invention.
Figure 11:
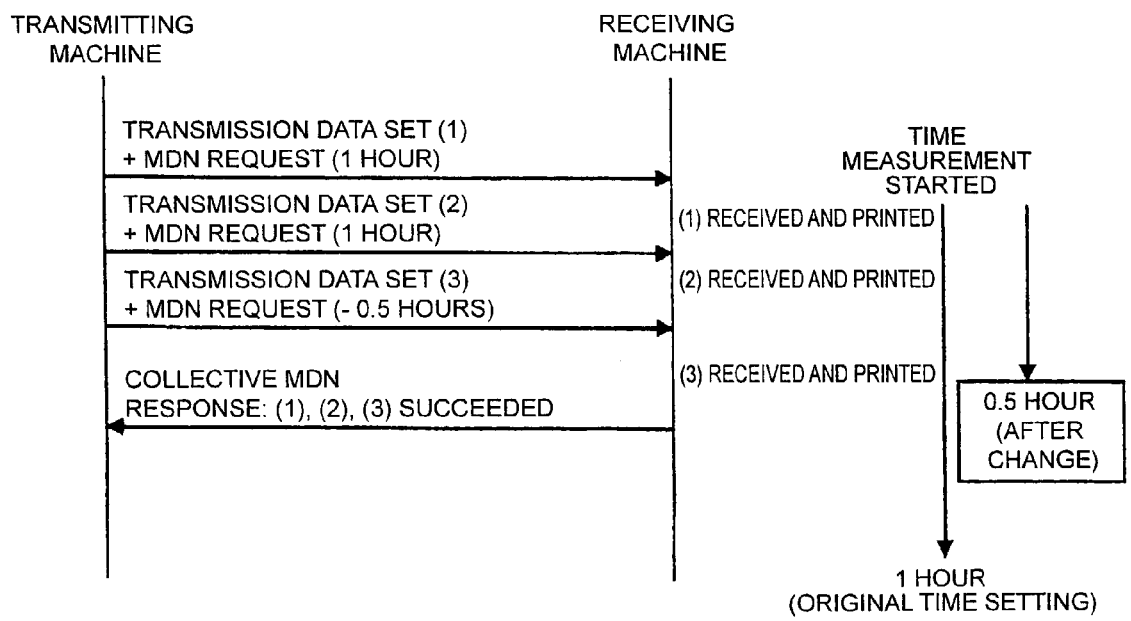

The facsimile/e-mail machine 1 in accordance with the present invention is not limited to the aforementioned embodiments, and may operate as in the following. The following will describe embodiment 5 in reference to FIG. 11.

A facsimile/e-mail machine 1 of embodiment 5 differs from the facsimile/e-mail machine 1 of the aforementioned embodiments in the arrangement and operation of the MDN transmission/reception control section 15. Accordingly, the following will describe only those differences.

A MDN transmission/reception control section 15 of embodiment 5 is for making an MDN request and managing received results of MDNs similarly to those of the aforementioned embodiments.

In embodiment 5, the return transmission conditions (for example, time settings) specified by the return transmission conditions incorporated in an MDN request contained in an e-mail message are changeable by the return transmission conditions incorporated in an MDN request contained in an e-mail message arriving after that e-mail message.

Specific examples will be described next in reference to figures. As shown in FIG. 11(a), data of two different original document images, i.e., a transmission data set (1) and a transmission data set (2), is transmitted in the form of individual e-mail messages each with an added MDN field. An elapsed time after the arrival of the e-mail message is used as return transmission conditions of the transmission data set (1) and the transmission data set (2). Here, the elapsed time setting is 1 hour.

Next, an e-mail message with an added MDN field is sent as a transmission data set (3). The transmission data set (3) has return transmission conditions that e-mail messages arriving during the 1 hour period prior to the arrival of the transmission data set (3) be consolidated to transmit an MDN. This is equivalent to the settings of the return transmission conditions of e-mail messages arriving during the 1 hour period prior to the arrival of the transmission data set (3) being changed to 0 hours. Therefore, at the receiving end, when the printing of the transmission data set (3) is completed, a collective MDN response which is a consolidation of MDN responses for the transmission data sets (1), (2), and (3) is returned.

According to the foregoing process, a collective MDN response can be returned from the receiving end to the recipient address specified in the MDN request.

As in the foregoing, the facsimile/e-mail machine 1 of embodiment 5 can transmit e-mail message MDN responses arriving within a specified time prior to the arrival of the e-mail messages in the consolidated form of a collective MDN response; therefore, for example, even when it is taking time for an MDN response to a data set transmitted earlier to arrive, an MDN response can be returned as in the foregoing; the transmitting end can therefore surely receive an MDN response.

Besides, the facsimile/e-mail machine 1 of embodiment 5 is not limited to the aforementioned embodiments, and may operate as in the following. Referring to in FIG. 11(b), data of two different original document images, i.e., a transmission data set (IFAx 1) and a transmission data set (2), is transmitted in the form of individual e-mail messages each with an added MDN field. An elapsed time after the arrival of the e-mail message is used as return transmission conditions of the transmission data set (1) and the transmission data set (2). Here, the elapsed time setting is 1 hour.

Next, a transmission data set (3) is sent. The transmission data set (3) has such return transmission conditions that change the time specified by an earlier transmitted e-mail message. Specifically, the return transmission conditions of the transmission data sets (1) and (2) which are transmitted earlier are reduced by 0.5 hours so that a collective MDN response is returned 0.5 hours after the arrival of the e-mail messages for the transmission data sets (1) and (2) which are transmitted earlier.

Therefore, as the printing of the transmission data set (3) completes, and the changed return transmission conditions of the transmission data sets (1), (2), and (3) come to be satisfied at the receiving end, the receiving end returns a collective MDN response which is a consolidation of the MDN responses to the transmission data sets (1), (2), and (3). According to the process, a collective MDN response can be returned from the receiving end to the recipient address specified in the MDN request.

As in the foregoing, the facsimile/e-mail machine 1 of embodiment 5 can change an e-mail message MDN response arriving within a specified time prior to the arrival of the e-mail message; therefore, for example, even when it is taking time for an MDN response to a data set transmitted earlier to arrive, a collective MDN response can be returned as in the foregoing; the transmitting end can therefore surely receive an MDN response.

It has been illustrated, as the return transmission conditions for an MDN request, that the return transmission conditions (for example, time setting) designated in an e-mail message are changed in another e-mail message arriving after the e-mail message. Conditions for a change are not limited to that particular example. Message count conditions may be changed, for example. This is possible by substituting a change in the message count for a change in time illustrated in FIG. 11(a) and FIG. 11(b).

Embodiment 6

Figure 12:
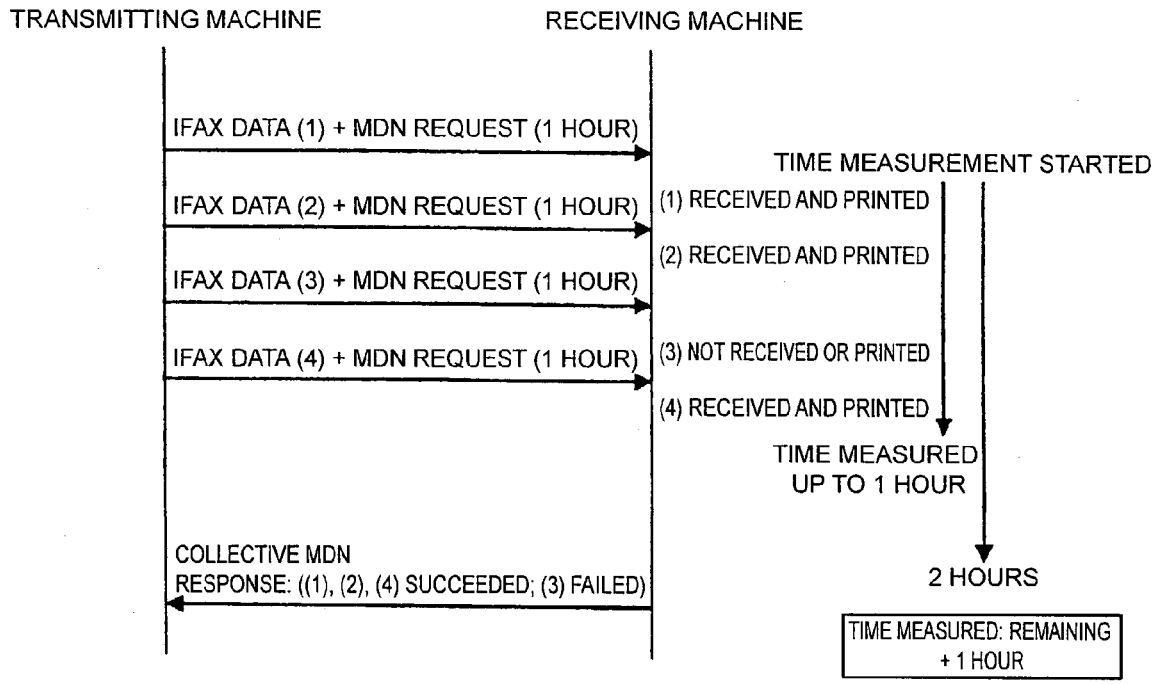
FIG. 12(a) and FIG. 12(b) depict a process of changing (extending) an MDN response standby time in a sixth embodiment in accordance with the present invention.
Figure 12:
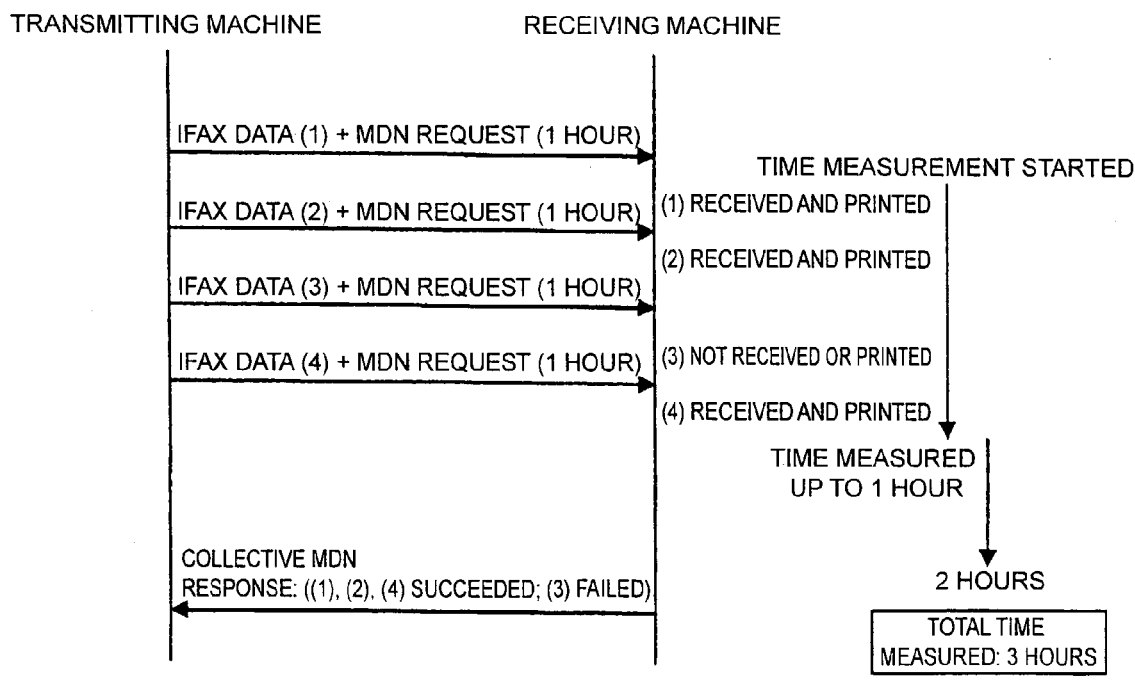

The facsimile/e-mail machine 1 in accordance with the present invention is not limited to the aforementioned embodiments, and may operate as follows. That is, the machine many be arranged so that the return transmission conditions (1 hour) in an earlier arrived e-mail message may be extended by a predetermined period (2 hours) as shown in FIG. 12(a) or so that the return transmission conditions (1 hour) in an earlier arrived e-mail message may be extended up to the expiration of a predetermined time from that moment (2 hours, which makes a total of 3 hours) as shown in FIG. 12(b). Either of the arrangements can extend the standby time depending upon the state of the transmit/receiving-end machine or the e-mail server.

It has been illustrated, as the return transmission conditions for an MDN request, that the return transmission conditions (for example, time setting) designated in an e-mail message are changed in another e-mail message arriving after the e-mail message. Conditions for a change are not limited to that particular example. Message count conditions may be changed, for example. This is possible by substituting a change in the message count for a change in time illustrated in FIG. 12(a) and FIG. 12(b).

Embodiment 7

The facsimile/e-mail machine 1 in accordance with the present invention is not limited to the aforementioned embodiments, and may operate as follows. That is, a collective response is transmitted which also covers earlier transmitted e-mail message MDN requests.

Figure 13:
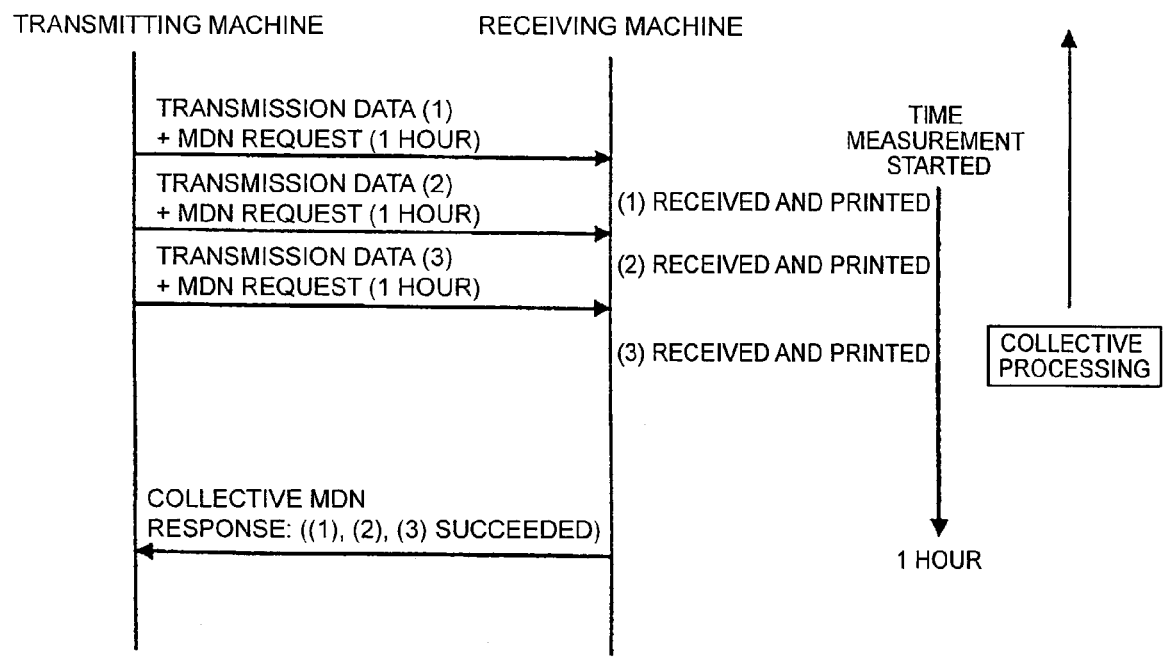
FIG. 13 depicts a process of changing an MDN response standby time (collective return request) in a seventh embodiment in accordance with the present invention.

Referring to FIG. 13, data of two different original document images, i.e., a transmission data set (1) and a transmission data set (2), are transmitted in the form of individual e-mail messages each with an added MDN field. An elapsed time after the arrival of the e-mail message is used as return transmission conditions of the transmission data set (1) and the transmission data set (2). Here, the elapsed time setting is 1 hour.

Next, a transmission data set (3) is sent. The return transmission conditions of the transmission data set (3) is designated so that a collective MDN response be returned which also covers earlier transmitted e-mail messages (collective return request: package). Therefore, even when no MDN response arrives for an extended period of time, a collective MDN response can be received at the transmitting end.

As in the foregoing, the facsimile/e-mail machine 1 of embodiment 7 returns a collective response to those e-mail message MDNs which arrived earlier than the e-mail message; therefore, for example, even when it is taking time for an MDN response to a data set transmitted earlier to arrive, a collective MDN response can be returned as in the foregoing; the transmitting end can therefore surely receive an MDN response.

As in the foregoing, the present invention provides a network communication device capable of responding by consolidating multiple MDN responses into a collective MDN response, using MDN protocol RFC 2298 (MDN: Message Disposition Notifications) which provides a means of notifying that a transmitted original document is processed successfully by the receiving machine.

The present invention is not limited to the embodiments. The embodiments have illustrated Internet facsimile machines for transmitting/receiving original document image data over the Internet. The present invention is applicable to, for example, simple network communication devices without a facsimile or scanner function.

Besides, the embodiments have illustrated methods of using MDN as means to convey return transmission conditions. The present invention is not limited to the embodiments: for example, the invention may be implemented using another field in place of MDN. The implementation using MDN as in the foregoing is however easy.

Besides, the embodiments have illustrated an MDN response being transmitted after the completion of the printing of a received e-mail message. The response may be transmitted before the printing. For example, the invention may be arranged so that the response is transmitted after it is determined whether the received e-mail message and the attachment thereto are properly readable.

Besides, the embodiments have assumed transmission data and reception data to be e-mail messages; the data may be of a different form.

As described in the forgoing, the present invention involves a network communication device equipped with e-mail message composing means for composing an e-mail message and e-mail message transmitting/receiving means for transmitting/receiving it. The e-mail message composing means has a disposition notification request incorporating function of incorporating a disposition notification request for an e-mail message disposition notification and return transmission conditions into the e-mail message and a collective disposition notification response composing function of composing a collective disposition notification response by consolidating disposition notification responses to multiple received e-mail messages into a single e-mail message. The e-mail message transmitting/receiving means has a disposition notification request recognizing function of recognizing the disposition notification request and the return transmission conditions incorporated in a received e-mail message. There are further provided: reception result monitoring means for monitoring reception (success or failure) of an e-mail message and composing a disposition notification response; and disposition notification controlling means for monitoring whether return transmission conditions incorporated in a received e-mail message are met and instructing, if the return transmission conditions are met, the e-mail message composing means to compose a collective disposition notification response and the e-mail message transmitting/receiving means to transmit the composed collective disposition notification response. Thereby, even if multiple e-mail messages each incorporating a disposition notification request are transmitted, the invention returns from the receiving end a single e-mail message containing a collective disposition notification response which is a consolidation of multiple disposition notification responses. Therefore, the invention reduces redundant e-mail message communication, and hence the network traffic, in making disposition notification.

The present invention involves the network communication device, where the e-mail message transmitting/receiving means has a disposition notification transmitting function of transmitting a collective disposition notification response to a recipient address specified in a received e-mail message and a disposition specification control function of consolidating multiple disposition notification responses to an identical, specified recipient address into a single, collective disposition notification response for transmission. Thus, if multiple e-mail messages containing a disposition notification request are received, and multiple disposition notification responses are to be transmitted to one of the recipient addresses, the invention, using the disposition specification controlling means, consolidates the multiple disposition notifications into a single disposition notification for transmission. Therefore, the invention reduces redundant e-mail message transmission, and hence the network traffic, in making disposition notification responses.

Further, the present invention involves the network communication device, where the disposition specification control function specifies response conditions for disposition notification by specifying return transmission conditions for disposition notification response according to return transmission conditions incorporated in a received e-mail message. Therefore, the invention reduces the return e-mail messages from the receiving end and facilitates management of disposition notification.

The present invention involves the network communication device, where the disposition specification control function specifies a predetermined standby time at the receiving end as return transmission conditions for a disposition notification response. This enables the terminal device at the receiving end to, upon the expiration of the specified predetermined standby time, consolidate multiple disposition notifications which will be transmitted to an identical, specified recipient address into a single e-mail message for transmission. Therefore, the invention consolidate disposition notification responses to e-mail messages for transmission, and prevents the transmission of redundant disposition notification responses to e-mail messages.

The disposition notification controlling means may be realized by, for example, determining the expiration of the predetermined standby time by means of a time measuring section for measuring time. The arrangement is also capable of determining whether a disposition notification response to any e-mail message arriving during the predetermined standby time contains should be transmitted to the single, specified recipient address.

The present invention involves the network communication device, where the disposition specification control function specifies a predetermined standby message count at the receiving end as the return transmission conditions for disposition notification response. If the number of stored e-mail messages has reached or exceeded the specified, predetermined standby message count, the terminal device at the receiving end thereby consolidates multiple disposition notification responses into a e-mail message as a collective disposition notification response for transmission. Therefore, the invention reduces redundant e-mail messages containing a disposition notification response.

The present invention involves the network communication device, where the disposition specification control function specifies a predetermined standby message count and a predetermined standby time at the receiving end as return transmission conditions for disposition notification response. Therefore, if means is included which makes both the standby time settings and standby message count settings, a response is transmitted to a single, specified recipient address upon the fulfillment of either of the conditions designated by the means. Therefore, the invention prevents situations where it takes a long time for the predetermined message count to be reached or the message count grew larger than necessary.

The present invention involves the network communication device, where the disposition specification control function immediately transmits a disposition notification response to an e-mail message containing return transmission conditions designating an immediate return of a disposition notification response. Therefore, the invention allows the transmitting end to freely specify return transmission conditions for disposition notification response, and hence quickly adapt to the status at the transmitting and/or receiving end. For example, if a reception at the receiving end has failed, the invention can cause the receiving machine to immediately transmit a disposition notification response, enabling, for example, a quick retransmission at the transmitting end.

The present invention involves the network communication device, where the disposition specification control function immediately transmits a disposition notification response to an e-mail message the reception of which at the receiving end has failed. Therefore, if the reception at the receiving end has failed, the invention returns a disposition notification without waiting for the specifies conditions to be fulfilled, enabling a quick retransmission at the transmitting end again.

The present invention involves the network communication device, where the disposition specification control function excludes in checking the return transmission conditions an e-mail message the reception of which has failed. Therefore, the invention, for example, exclude in checking the standby message count conditions those e-mail messages which have not been successfully received and returned, thereby being capable of sending disposition notifications for the predetermined standby message count in a single, collective disposition notification.

The present invention involves the network communication device, where the disposition specification control function immediately transmits a disposition notification response to an e-mail message for which an urgent disposition notification is needed. Therefore, the invention is capable of causing the receiving machine to immediately transmit a response to an e-mail message for which an urgent transmission confirmation is needed, thereby reducing the standby time and improving efficiency of the confirmation process.

The present invention involves the network communication device, where the disposition specification control function exclude in checking the standby conditions an e-mail message for which an urgent disposition notification is needed. Therefore, the invention excludes in checking the standby conditions those e-mail messages for which urgent responses have been returned, thereby being capable of, for example, sending a collective disposition notification response to a predetermined standby message count in a single disposition notification. Therefore, the invention prevents transmission of redundant disposition notifications.

The present invention involves the network communication device, where the disposition specification control function replaces return transmission conditions specified in earlier received e-mail message with return transmission conditions specified in a later received e-mail message. Therefore, the invention allows the disposition specification control function to change, even after transmission, the predetermined conditions specified in an earlier transmitted e-mail message by an e-mail message transmitted later, thereby the conditions to be changed freely according to the status at the transmitting end and/or the receiving end after the transmission of an e-mail message. Hence, the invention addresses a situation where, for example, it is taking a long time for a disposition notification response to an earlier transmitted e-mail message to arrive, through a later transmitted e-mail message so that a quick disposition notification response is received.

The present invention involves the network communication device, where the disposition specification control function changes a standby time in an earlier received e-mail message as conditions in changing the return transmission conditions. Therefore, the invention addresses a situation where it is taking time for a disposition notification response to earlier transmitted transmission data, by changing the standby time at the receiving end. The invention hence ensures that a disposition notification response is received at the transmitting end. The invention may also extend the standby time according to the status of the machine(s) at the transmit/receiving end(s) and the e-mail server.

The present invention involves the network communication device, where the disposition specification control function, even if return transmission conditions specified in an earlier transmitted e-mail message are not yet to be met, immediately transmits a collective disposition notification response to a later received e-mail message specifying a collective return request as return transmission conditions. Therefore, the invention addresses a situation where it is taking a long time before the specified conditions are fulfilled and a disposition notification response is returned, by returning a collective disposition notification response which is a consolidation including that earlier transmitted e-mail message (for example, in an earlier example in accordance with the present invention, a designation "collective return request: package" was made), hence enabling reception of an immediately consolidated disposition notification response at a specified timing.

Embodiment 8

The following will describe embodiment 8 in accordance with the present invention in reference to FIGS. 15-25.

The present embodiment assumes a communication device in accordance with the present invention to be a facsimile/e-mail machine for transmitting/receiving e-mail messages and image information utilizing the e-mail message over the Internet or like network.

Figure 15:
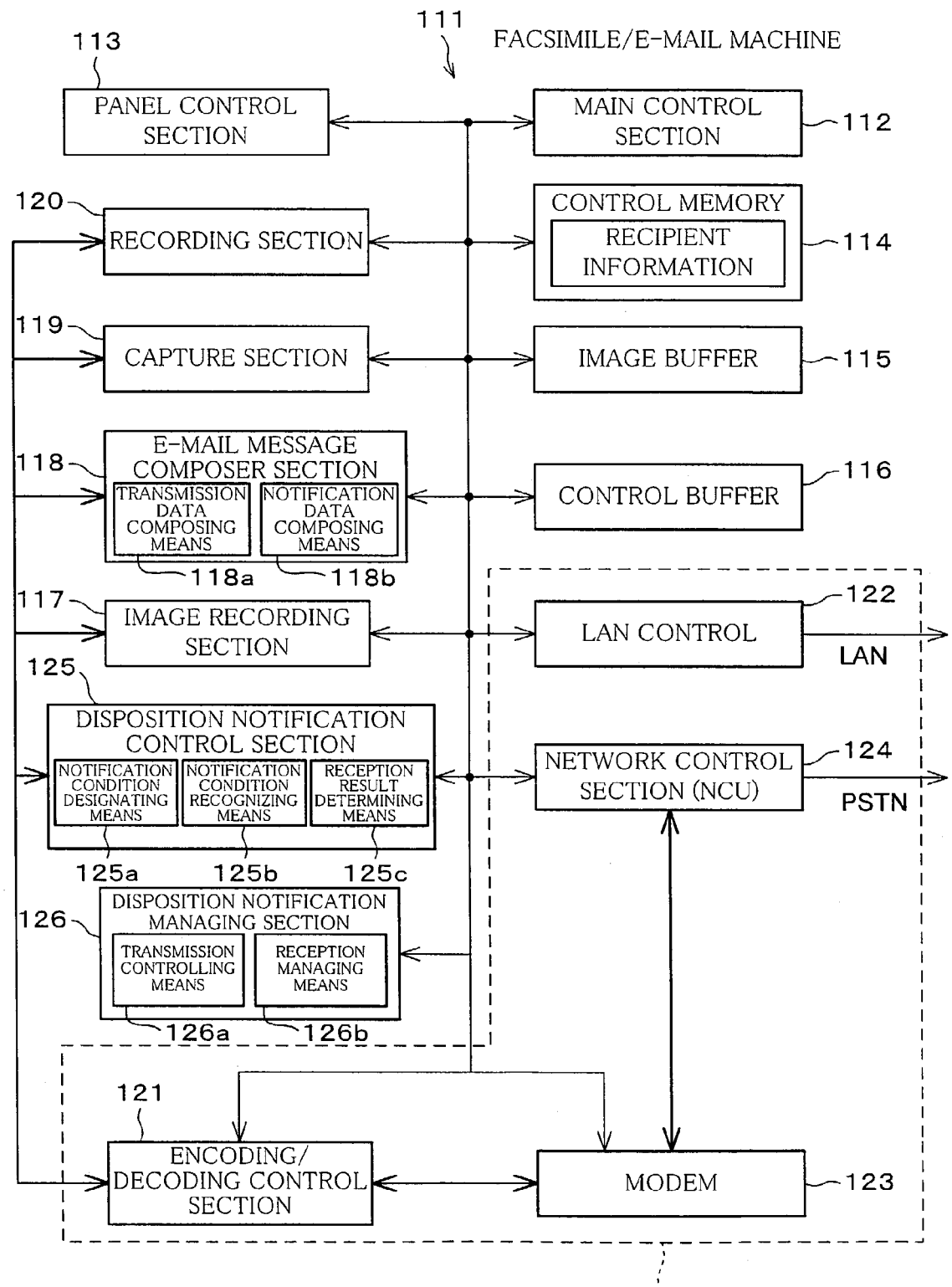
FIG. 15 is a block diagram illustrating an electrical arrangement of a facsimile/e-mail machine in an eighth embodiment in accordance with the present invention.

FIG. 15 is a block diagram showing an electrical arrangement of a facsimile/e-mail machine 111 of the present embodiment. The facsimile/e-mail machine 111 has functions as a printer/copying machine which prints data on paper or anther storage medium and an ordinary facsimile machine (fax) which operates over telephone lines, as well as those an e-mail message (e-mail/FTP (File Transfer Protocol)) machine which exchange e-mail messages and files with a server over the Internet or like network and an Internet facsimile machine.

The facsimile/e-mail machine 111 is primarily made up of a main control section 112, a panel control section 113, a control memory 114, an image buffer 115, a control buffer 116, an image recording section 117, an e-mail message composer section 118, a capture section 119, a recording section 120, an encoding/decoding control section 121, an LAN (Local Area Network) control section 122, a modem 123, a network control section (NCU, Network Control Unit) 124, a disposition notification control section 125, and a disposition notification managing section 126.

The main control section 112 includes a CPU (Central Processing Unit) and components, to control the facsimile/e-mail machine 111.

The panel control section 113 provides a means of displaying a screen where instructions are given for original document capturing, recipient input, and other actions. The panel control section 110 includes a display and a console section (not shown). The display is made up of a liquid crystal display (LCD, Liquid Crystal Display), CRT (Cathode Ray Tube) display, or the like to display an operation status and transmission destination. The console section has keys necessary to operate the machine. A recipient is specified using on the console section. Specified recipient information is stored in the control memory 114. The display and the console section may be integrated into a touch panel.

The control memory 114 is made up of ROM and other involatile memory, or backed-up volatile memory, and related devices, holding control programs and recipient information. The image buffer 115 is made up of RAM and related devices, offering temporarily storage in the compression and decompression of image data to be transmitted/received. The control buffer 116 is made up of RAM and related devices, holding data required to run control programs. The image recording section 117 stores coded image data and other data, including data read from the capture section 119 (detailed later), reception data, and decoded data. Data may not be stored in the image recording section 117 and directly processed using the image buffer.

The e-mail message composer section 118 converts text information and coded image data to an e-mail compatible format by adding header information to them. The e-mail message composer section 118 will be detailed later. The capture section 119 is a scanner based on opto-electric transducers, or charge coupled devices (CCDs), as original document capture means, capturing an original document at a predetermined resolution for dot image data output. The recording section 120 includes an electrophotographic printer, making a hard copy of (printing) data, such as original document images received through communications and captured by the capture section 119.

The encoding/decoding control section 121 encodes captured original document image data and decodes reception data. More specifically, the encoding/decoding control section 121 encodes/compresses original document image data captured by the capture section 119 and decodes received, encoded/compressed original document image data to restore the original data. With the encoding/decoding control section 121 can be employed encoding schemes commonly used in facsimile communications, such as MH (Modified Huffman), MR (Modified READ), and MMR (Modified Modified READ).

The LAN control section 122 acts to connect to the LAN for e-mail and facsimile communications over the Internet. The modem 123 provides a means of performing ordinary facsimile communications and is made up of a facsimile modem capable of facsimile communications. The modem 123 is connected to an analog public switched telephone network (PSTN) via a network control section 124. The network control section 124 is hardware implementing line control operation by closing and opening a line involving a public switched telephone network to connect the modem 123 to the public switched telephone network where necessary.

The disposition notification control section 125 provides a means of making a request for a disposition notification (MDN request) by an MDN (Message Disposition Notification) function whereby an e-mail message disposition notification is sent and managing responses (MDN response) to the request for a disposition notification regarding received e-mail messages. The disposition notification control section 125 controls using header information added by the e-mail message composer section 118. The disposition notification managing section 126 has calendar and clock functions to manage timing of making an MDN response to an MDN request. The disposition notification control section 125 and the disposition notification managing section 126 will be detailed later.

In the facsimile/e-mail machine 111, the encoding/decoding control section 121, the LAN control section 122, the modem 123, and the network control section 124 constitute transmitting means 127 for transmitting data and receiving means 128 for receiving data. When the facsimile/e-mail machine 111 communicates over an LAN, the LAN control section 122 is activated. When it communicates over an analog public switched telephone network, the network control section 124 is activated.

The following will describe the functions of the facsimile/e-mail machine 111 regarding the MDN request and the MDN response.

The disposition notification control section 125 is provided with notification condition designating means 125a and notification condition recognizing means 125b. The notification condition designating means 125a operates when the facsimile/e-mail machine 111 is used as a transmitting-end communication device (transmitting-end machine). The notification condition designating means 125a, when sending transmission data with an MDN request, designates conditions to define the timing for the receiving-end machine to make an MDN response and generates a notification condition information showing the conditions. The notification condition recognizing means 125b operates when the facsimile/e-mail machine 111 is used as a receiving-end communication device (receiving-end machine). The notification condition recognizing means 125b, when reception data contains notification condition information, recognizes the conditions in the notification condition information.

Besides, the disposition notification control section 125 may be further provided with a reception result determining means 125c. The reception result determining means 125c operates when the facsimile/e-mail machine 111 is used as a receiving-end machine, and determines a result of reception of reception data.

The disposition notification managing section 126 is provided with transmission controlling means 126a which operates when the facsimile/e-mail machine 111 is used as a receiving-end machine. The transmission controlling means 126a defines a timing of an MDN response on the basis of recognition by the notification condition recognizing means 125b in the disposition notification control section 125.

If the disposition notification control section 125 is provided with a reception result determining means 125c, the transmission controlling means 126a may further define a timing of an MDN response on the basis of determination by the reception result determining means 125c.

Besides, the disposition notification managing section 126 may be provided with reception managing means 126b which operates when the facsimile/e-mail machine 111 is used as a transmitting-end machine. When sending transmission data with an MDN request, the reception managing means 126b determines in specifying a time to transmit an MDN from the receiving-end machine whether an MDN corresponding to the transmission data is received within a predetermined period with respect to the specified time.

The e-mail message composer section 118 is provided with transmission data composing means 118a and notification data composing means 118b. The transmission data composing means 118a operates when the facsimile/e-mail machine 111 is used as a transmitting-end machine. The transmission data composing means 118a composes transmission data by incorporating notification request information indicating an MDN request and notification condition information generated by the notification condition designating means 125a into data to be transmitted. The notification data composing means 118b operates when the facsimile/e-mail machine 111 is used as a receiving-end machine. The notification data composing means 118b, when reception data includes notification request information indicating an MDN request, composes notification data for MDN (data indicating the content of a disposition notification, will be referred simply as "notification data").

Alternatively, when it turns out, on the basis of a result of the recognition by the notification condition recognizing means 125b, that for example, there exist multiple reception data sets for which notification data should be transmitted at the same timing, the notification data composing means 118b may compose a single notification data set by consolidating the contents of the MDNs for the multiple reception data sets.

Figure 16:
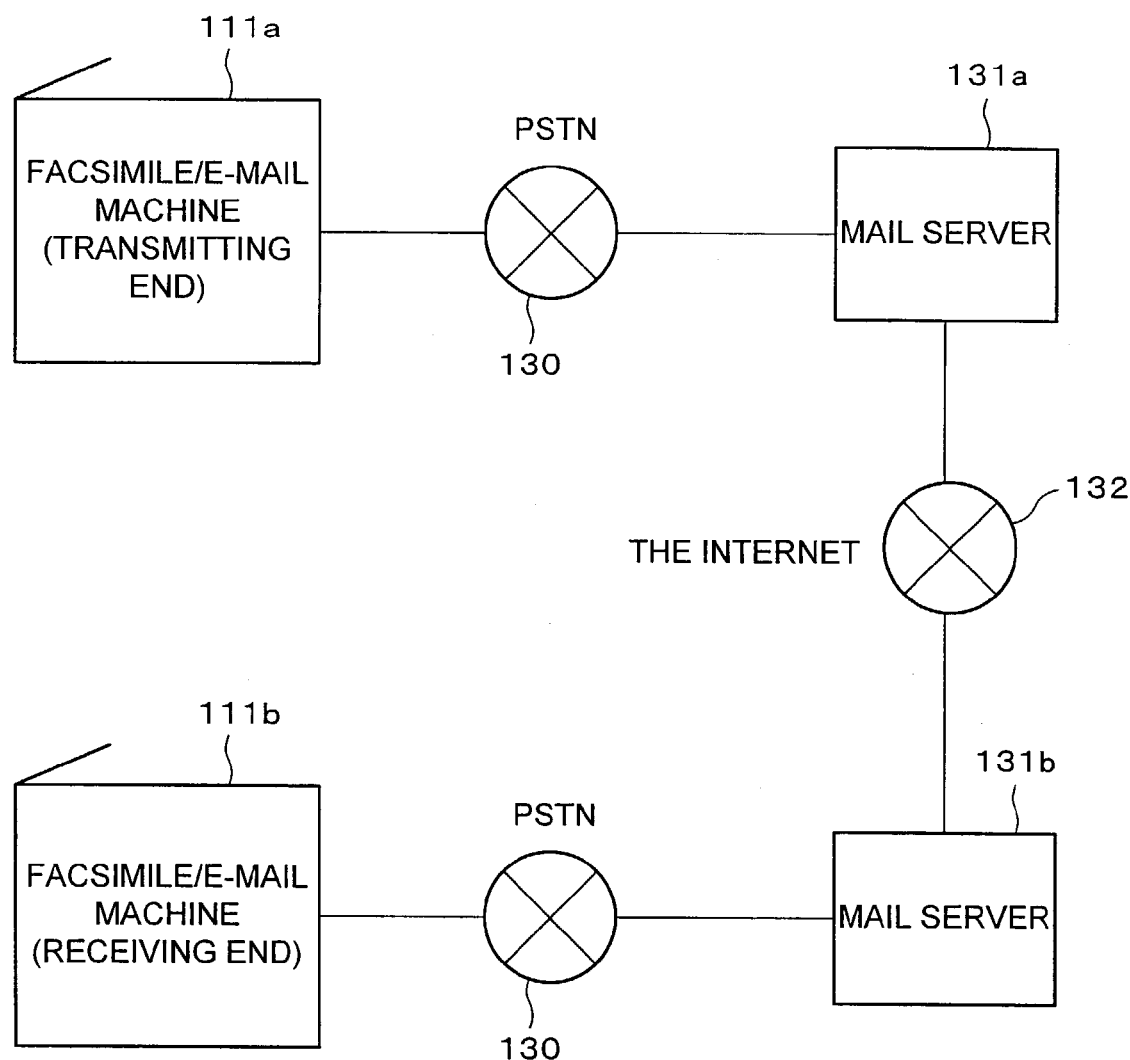
FIG. 16 is a block diagram illustrating, as an example, a configuration of a communications system built around the facsimile/e-mail machine in FIG. 1.

FIG. 16 is a block diagram showing an arrangement example of a communications system arranged using a facsimile/e-mail machine 111. This communications system is provided with a transmitting-end machine 111a and a receiving-end machine 111b which are both identical to the facsimile/e-mail machine 111.

In the communications system, the transmitting-end machine 111a and the receiving-end machine 111b can communicate with e-mail servers 131a, 131b via respective analog public switched telephone networks 130. Besides, the e-mail servers 131a, 131b are adapted to communicate with each other over the Internet 132.

Here, attention should be paid to the function of the facsimile/e-mail machine 111 as the transmitting-end machine 111a; it would be understood that the transmitting-end machine 111a includes the notification condition designating means 125a which specifies conditions by which a MDN response timing is determined, the transmission data composing means 118a which composes transmission data by incorporating a notification request information indicating an MDN request and notification condition information indicating conditions specified by the notification condition designating means 125a into data to be transmitted, and the transmitting means 127 transmitting this transmission data.

FIG. 17 shows the content of a transmitted message (e-mail message) as the transmission data. In FIG. 17, (a) refers to a header, (b) refers to a main text, and (c) refers to an attachment file. Although (a)-(c) are shown divided in FIG. 17 for illustrating purposes, in actuality, the e-mail message is not divided.

The header (a) is an area showing information on, for example, e-mail message transmission/reception and the Internet delivery. Here, each line in the header shows unique information used in, for example, transmission/reception. Each of these lines will be hereinafter referred to as a "field." For example, "To field" shows the address of the recipient of an e-mail message.

Here, the transmitted e-mail message contains has a field (a-1) or (a-2) for an MDN request, in addition to the header (a). (a-1) and (a-2) specify the address of a transmission destination to which a response message as notification data should be sent, based on the "Disposition-Notification-To field" (MDN field) defined in RFC 2298. The MDN field gives notification request information indicating an MDN request. In FIG. 17, the transmission destination is specified as "Sharp_Doc_InternetFAX@sharp.co.jp".

Besides, to show to which transmitted e-mail message the response is to be made when making an MDN response, an ID which identifies the e-mail message is provided with respect to the transmitted e-mail message in the message-ID field upon transmission. The e-mail message can be identified by returning the ID assigned to the transmitted e-mail message in the response message. In FIG. 17, the ID is specified as "<111@SHARP_D1>".

Besides, as in (a-1) in FIG. 17, after the Disposition-Notification-To field, the transmitted e-mail message contains notification condition information showing conditions specified by the notification condition designating means 125a. (a-1) in FIG. 17 shows, as notification condition information, information which sets an MDN response time to Sep. 22, 2001 in the +09:00 time zone in reference to GMT (Greenwich Mean Time).

In this manner, the transmitting-end machine 111a provides notification condition information, as well as notification request information, in the MDN field. In this case, the notification request information and the notification condition information are text data contained in the transmitted e-mail message. This makes it easy to include the information in a transmitted e-mail message and also for the receiving-end machine 111b which is the receiving end of the transmitted e-mail message to recognize the information.

Another method of including notification condition information is to add a "Disposition-Notification-Options" field as in (a-2) in FIG. 17.

The main text in (b) in FIG. 17 is the "body" of an e-mail message used for message transmission/reception. FIG. 17 shows a transmitted e-mail message for an Internet facsimile communication, and the main text there is simple.

Besides, the attachment in (c) in FIG. 17 is an attachment of an encoded image file, and its format is defined as MIME (Multipurpose Internet Mail Extensions).

According to the arrangement, MDNs to multiple transmission data sets can be consolidated at a time as will be detailed later, by transmitting transmission data notification condition information indicating conditions that define an MDN response timing, as well as notification request information indicating an MDN request, to the receiving-end machine 111b.

Besides, the transmitting-end machine 111a preferably further includes: receiving means 128 for receiving notification data; reception managing means 126b for, when notification condition information is information specifying an MDN time, determining whether the receiving means 128 has received notification data corresponding to the transmission data within a predetermined period relative to the MDN time specified by the notification condition information in the transmission data from the transmitting means 127; and alerting means for, when the reception managing means 126b has determined that the notification data is not received within that period, alerting the user to it. The alerting means is provided by the panel control section 113; it would be sufficient if an alert to the situation is displayed on the display via the panel control section 113.

According to the arrangement, the user is alerted if transmission data is transmitted with an MDN time specified, and notification data corresponding to that transmission data is not received within a predetermined period relative to that time. Transmission error is a possible cause of such a failure to receive notification data within the period in this manner. Alerting the user in the foregoing manner enables quick implementation of a necessary succeeding process, such as a retransmission.

Now, focusing on the function of the facsimile/e-mail machine 111 as the receiving-end machine 111b, it can be said that the receiving-end machine 111b includes: receiving means 128 for receiving data; notification data composing means 118b for composing, when notification request information indicating an MDN request is contained in reception data, notification data; transmitting means 127 for transmitting the notification data; notification condition recognizing means 125b for, when notification condition information indicating conditions that define an MDN response timing is contained in the reception data, recognizing those conditions; and transmission controlling means 126a for determining a timing of the transmission of the notification data from the transmitting means 127, i.e., an MDN response timing, on the basis of a result of the recognition.

According to the arrangement, when notification condition information indicating conditions that define an MDN response timing is contained in contained in reception data, the notification condition recognizing means 125b recognizes the conditions. Besides, the transmission controlling means 126a determines a timing of the transmission of notification data from the transmitting means 127 on the basis of a result of the recognition.

Therefore, by transmitting the data, including notification condition information, from the transmitting-end machine 111a to the receiving-end machine 111b, the receiving-end machine 111b transmits notification data at a timing determined on the basis of the conditions.

Figure 18:
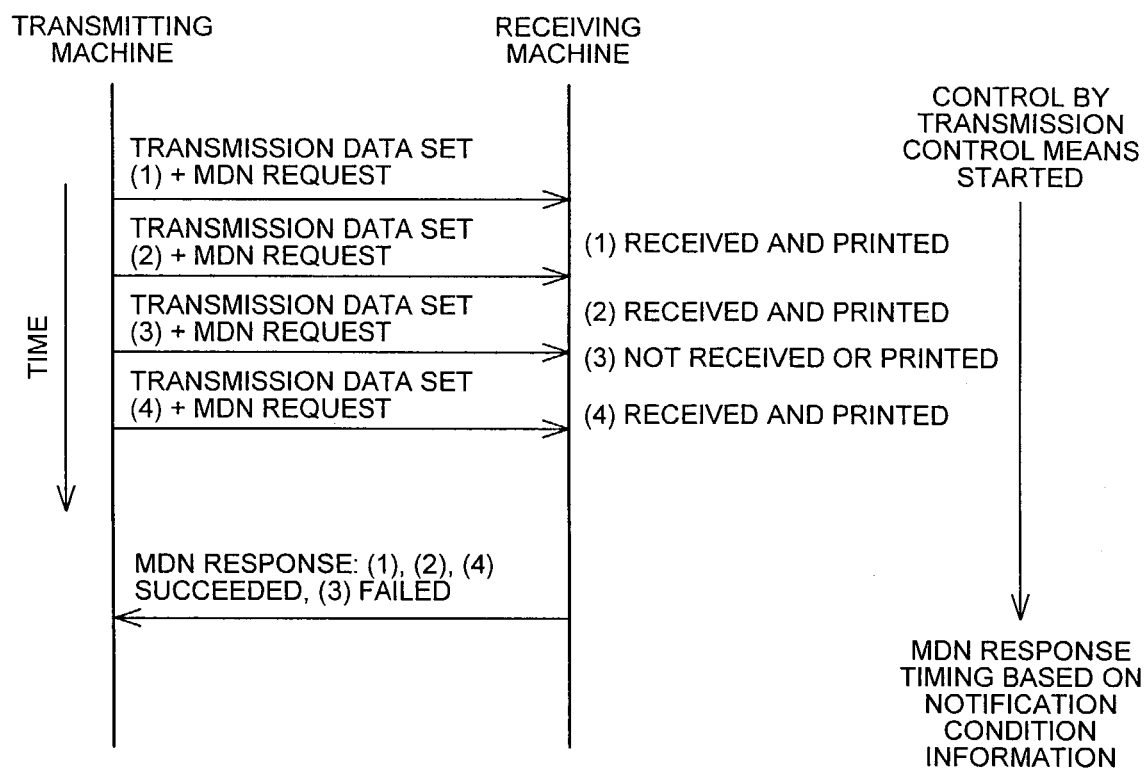
FIG. 18 is a conceptual sketch showing a flow of MDN disposition notification in accordance with the present invention.

Hence, when, for example, the multiple transmission data sets (1)-(4) are transmitted at different times from the transmitting-end machine 111a to the receiving-end machine 111b as shown in FIG. 18, the transmitting-end machine 111a can receive a collective MDN after the transmission of the last transmission data set (4), or in other words, receive a collective MDN response to the multiple transmission data sets (1)-(4) at a time.

As a result, the task can be conveniently performed whereby the user of the transmitting-end machine 111a can collectively confirm the MDNs to the multiple transmission data sets (1)-(4) at one time.

As an alternative, the notification condition designating means 125a in the transmitting-end machine 111a may be adapted to be capable of specifying a date on which the receiving-end machine 111b should make an MDN response as notification condition information. This allows the user of the receiving-end machine 111b to perform a MDN response confirmation once every any given days.

Besides, the notification condition designating means 125a in the transmitting-end machine 111a may be adapted to be capable of specifying a time at which the receiving-end machine 111b should make an MDN response as notification condition information. This allows the user of the receiving-end machine 111b to perform an MDN response confirmation once every any given hours.

Besides, the notification condition designating means 125a in the transmitting-end machine 111a may be adapted to be capable of specifying a date and time at which the receiving-end machine 111b should make an MDN response as notification condition information.

Besides, the notification condition designating means 125a in the transmitting-end machine 111a may be adapted to be capable of specifying a day of the week on which the receiving-end machine 111b should make an MDN response as notification condition information. This allows the user of the receiving-end machine 111b to perform a collective, weekly MDN response confirmation on a specific day of the week.

As an alternative, regarding the notification condition designating means 125a in the transmitting-end machine 111a, the notification condition information is not only information specifying an MDN time, but may also be information specifying other conditions, for example, information specifying an MDN response at a timing when data is received for the predetermined number of messages.

Here, the notification data composing means 118b preferably composes a single notification data by consolidating MDNs for multiple reception data sets on the basis of a result of the recognition by the notification condition recognizing means 125b.

According to the arrangement employing the result of the recognition by the notification condition recognizing means 125b, when it turns out that, for example, there exist multiple reception data sets for which notification data should be transmitted at the same timing, the notification data composing means 118b is able to transmit a single notification data set which is a consolidation of disposition notifications for the multiple reception data sets.

This reduces the number of communications for MDN which in turn reduces the traffic on the public switched telephone network 130 and the Internet 132.

FIG. 19 shows the content of a response message (e-mail message) as the notification data. In FIG. 19, (a) refers to a header, (b) refers to a main text, and (c) refers to MDN information. Although (a)-(c) are shown divided in FIG. 19 for illustrating purposes, in actuality, the e-mail message is not divided.

Here, the To field in the header (a) shows the address specified in the Disposition-Notification-To field in the transmitted e-mail message in FIG. 17.

Besides, the MDN information (c) is information showing the content of an MDN. The content of an MDN is shown principally in the field marked "A" in FIG. 19. These fields show the following information.

The "Final-Recipient" field at the top shows the recipient address of the MDN response. The "Original-message-ID" field in the middle is an ID identifying a transmitted e-mail message related to the MDN, showing an ID corresponding to the Original-message-ID field in (a) in FIG. 17. The "Disposition" field at the bottom shows a success/failure status of the processing of the transmitted e-mail message having an ID as shown in the Original-message-ID field in the middle.

Conventionally, the Original-message-ID field shows only a single ID. In the response message in FIG. 19, the Original-message-ID field can show multiple IDs to consolidate MDNs.

Besides, preferably, the receiving-end machine 111b is provided with reception result determining means 125c for determining a result of the reception of reception data, and the transmission controlling means 126a determines an MDN response timing further on the basis of a result of the determination by the reception result determining means 125c.

Figure 20:
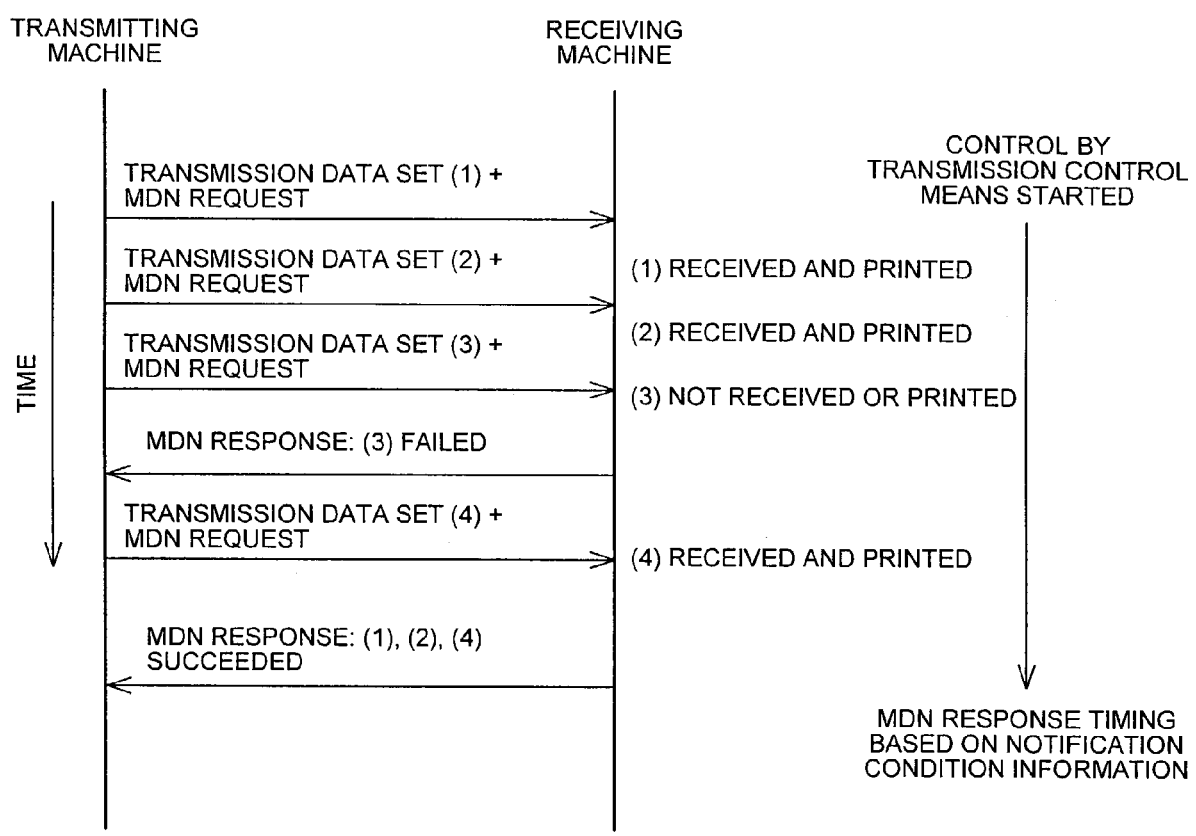
FIG. 20 is a conceptual sketch showing a flow of MDN disposition notification in accordance with the present invention.

According to the arrangement, an MDN response timing can be determined on the basis of a result of the reception of reception data. Therefore, for example, when it is determined that an error has occurred in the reception of reception data, an MDN response can be immediately made regardless of the conditions indicated in the notification condition information as shown in FIG. 20. As a result, the transmitting-end machine 111a can, if necessary, quickly perform a retransmission or other operation at a later time.

Figure 21:
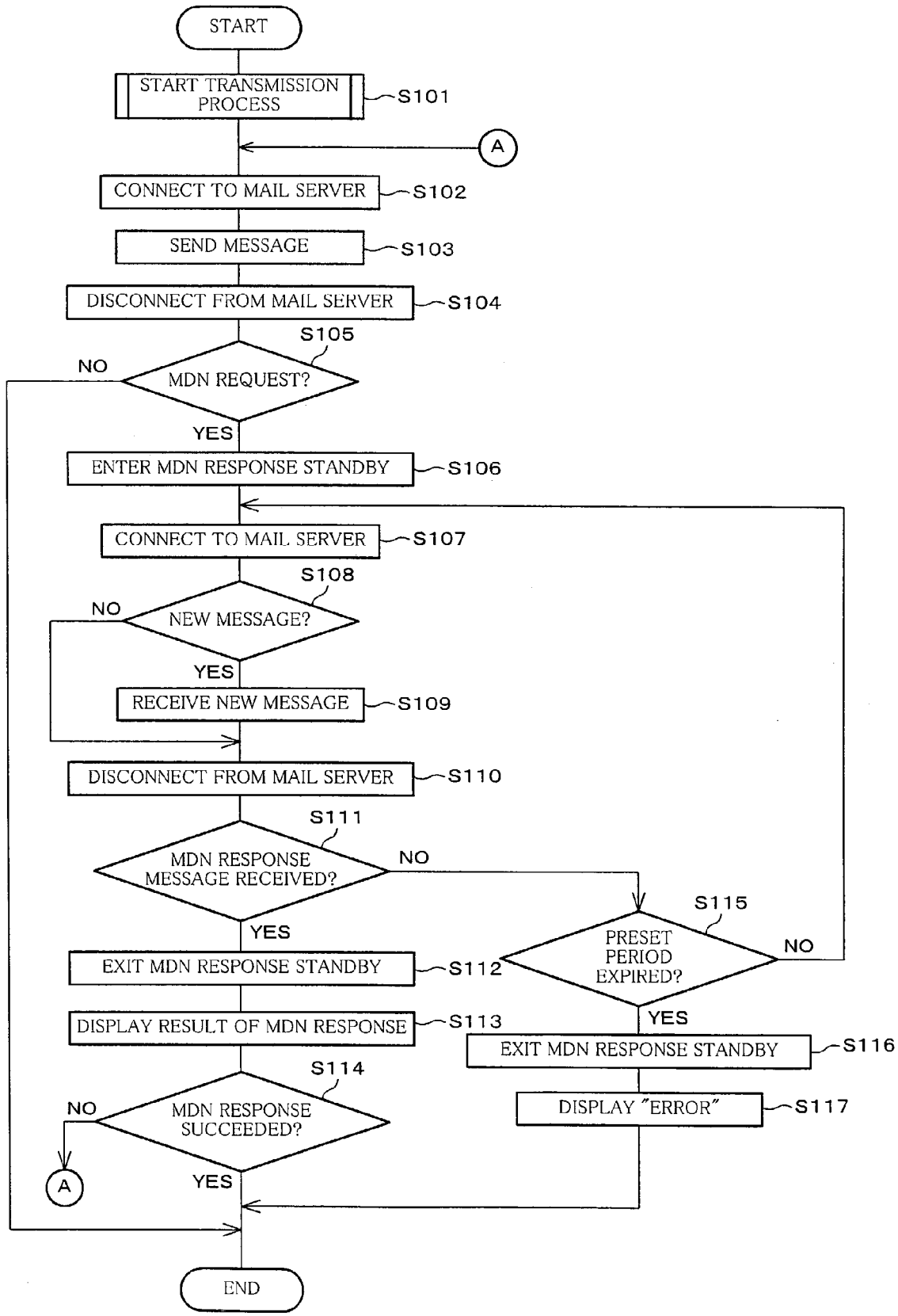
FIG. 21 is a flow chart illustrating a flow of a process of the facsimile/e-mail machine in FIG. 1 functioning as a transmitting-end machine.
Figure 22:
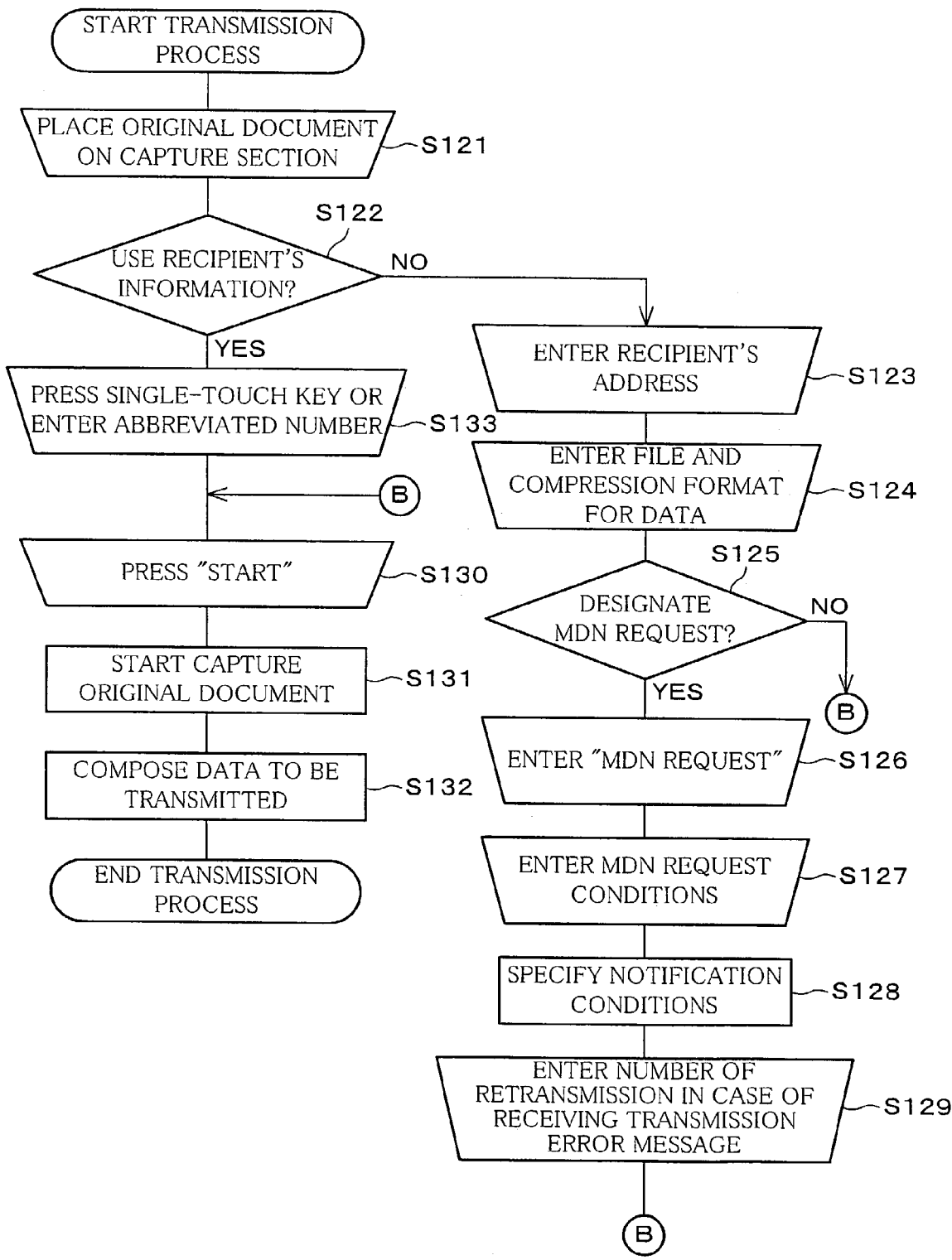
FIG. 22 is a flow chart illustrating a flow of a process of the facsimile/e-mail machine in FIG. 1 functioning as a transmitting-end machine.

FIG. 21 and FIG. 22 are flow charts showing an example of a process flow (data transmission processing method) in the transmitting-end machine 111a. The following will describe a process flow (data transmission processing method) in the transmitting-end machine 111a based on FIG. 21 and FIG. 22, as well as FIG. 15 and FIG. 16 where appropriate. The following process assumes that the user inputs and selections are made through the panel control section 113.

The transmitting-end machine 111a first implements a transmission starting step S101. In the transmission starting step, the user places an original document on the capture section 119 of the transmitting-end machine 111a (S121) and selects whether a transmission will be based on recipient information stored in the control memory 114 (S122).

If a transmission will not be based on recipient information, the user enters the address of the transmission destination (S123) and a file format, compression format, etc. of the transmission data (S124).

Figure 24:
FIG. 24 shows an input screen through which conditions are input to determining the timing for an MDN response.

Next, the user selects whether to designate an MDN request (S125). If such a request is to be designated, the user makes settings to issue an MDN request (S126) and enters conditions for determining an MDN response timing (S127). FIG. 24 shows an example of an input screen for these procedures.

Based on S127 inputs, the notification condition designating means 125a specifies conditions for determining an MDN response timing and generates notification condition information indicating the conditions (notification condition designating step S128).

Further, the user enters the number of retransmissions to be made if an MDN response reports a disposition error (S129).

Next, as the user presses the start key (S130), the capture section 119 starts capturing the original document (S131).

The transmission data composing means 118a then composes transmission data by incorporating the notification request information indicating the MDN request, as well as the notification condition information generated in S128, into the data to be transmitted (transmission data composing step S132).

If the user has in S122 selected transmission based on recipient information, the user press a single-touch key or enter an abbreviated number associated to the recipient (S133). Since the recipient information includes the results of a setup procedures in a previous process similar to S123-S129, the user does not need to designate the recipient information again.

Next, the transmitting means 127 connects to the e-mail server 131a (S102), transmits a transmitted e-mail message as the transmission data (transmitting step S103), and thereafter terminates the connection to the e-mail server 131a (S104).

If the user has in S126 has made settings to issue an MDN request (S105), the reception managing means 126b enters MDN response standby (S106) and waits until the MDN response time is reached which is specified by the notification condition information included in the transmission data. Then, the transmitting means 127 connects to the e-mail server 131a (S107).

When there is a new e-mail message in the e-mail server 131a (S108), the receiving means 128 receives the new e-mail message (S109) and terminates the connection to the e-mail server 131a (S110).

When an MDN response message is received as the new e-mail message (S111), the MDN response standby is exited (S112), and a result of the MDN response is displayed by the panel control section 113 or printed by the recording section 120 (S113). An example of the displayed or printed result is shown in FIG. 25. FIG. 25 shows a single response message which is a consolidation of MDNs to 3 transmitted e-mail messages.

If the result of the MDN response is "Received," the process is terminated; otherwise, the process of S102 onwards is repeated for a retransmission (S114).

If no MDN response message is received in S111, the reception managing means 126b confirms whether a predetermined period with respect to the MDN response time has expired (S115). If the period has not expired, the process from S107 onwards is repeated; if it has, the MDN response standby is exited (S116), an error alert is displayed on the display by the panel control section 113 (S117).

Figure 23:
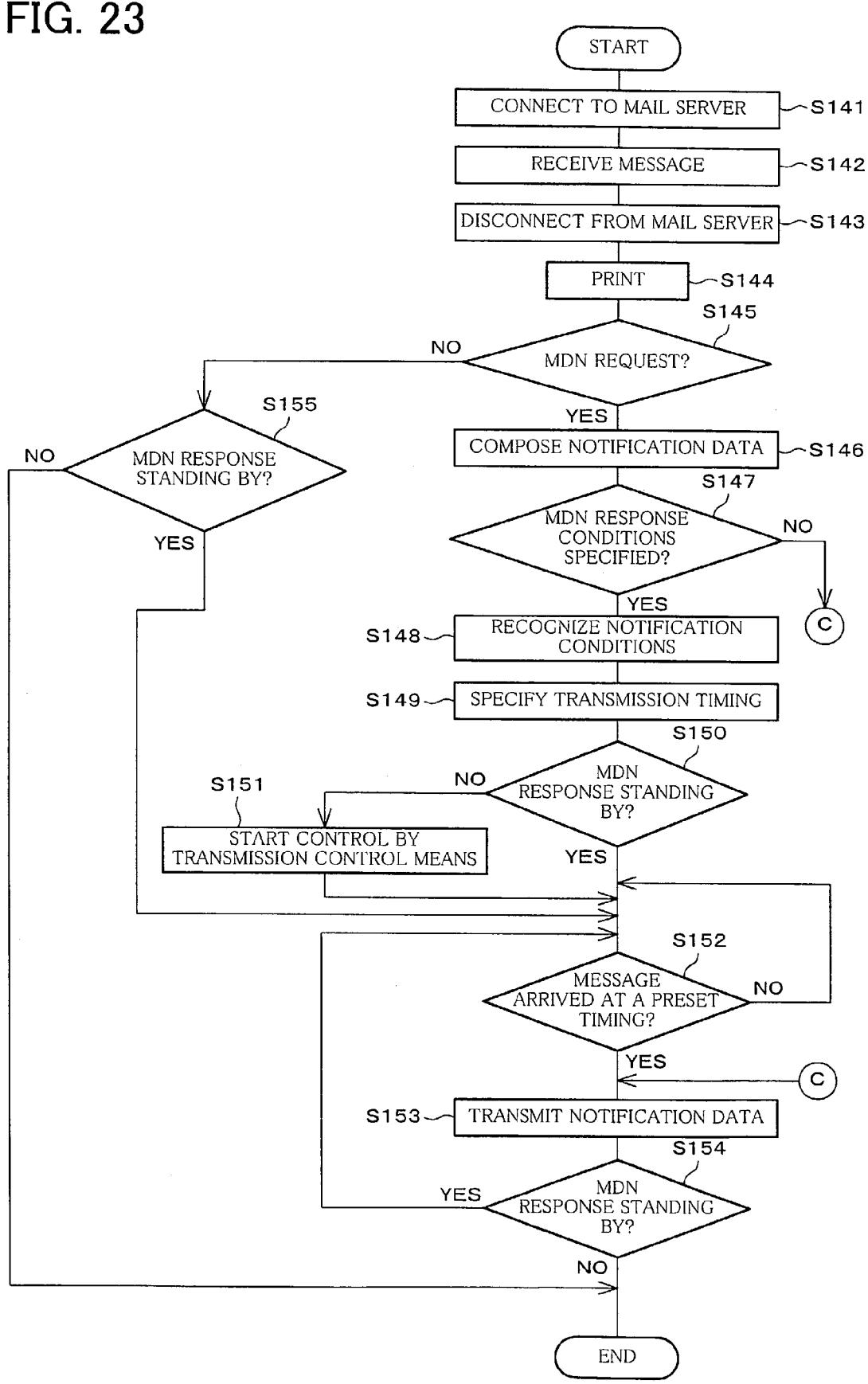
FIG. 23 is a flow chart illustrating a flow of a process of the facsimile/e-mail machine in FIG. 1 functioning as a receiving-end machine.

FIG. 23 is a flow chart showing an example of the process flow (data reception processing method) in the receiving-end machine 111*b*. The following will describe a process flow in the receiving-end machine 111*b* based on FIG. 23, as well as FIG. 15 and FIG. 16 where appropriate.

The receiving-end machine 111*b* first performs a reception operation, whereby the receiving means 128 connects to the e-mail server 131*b* (S141), receives a received e-mail message as reception data (receiving step S142), and thereafter terminates the connection to the e-mail server 131*b* (S143).

Next, after the recording section 120 prints out the received e-mail message (S144), the disposition notification control section 125 determines whether the received e-mail message contains notification request information indicating an MDN request (S145).

If an MDN request is contained, the disposition notification control section 125 further determines whether the received e-mail message contains notification condition information indicating conditions for determining an MDN response timing (S147). If the received e-mail message contains notification request information, the notification data composing means 118*b* composes notification data (notification data composing step S146).

If the received e-mail message contains notification request information, but not notification condition information, the notification data composed in S146 is immediately transmitted (an MDN response is made) (S153).

If the received e-mail message contains both notification request information and notification condition information, the notification condition recognizing means 125*b* recognizes the conditions indicated in the notification condition information (notification condition recognizing step S148), and the transmission controlling means 126*a* determines a timing of transmitting the notification data on the basis of a result of the S149 recognition (transmission timing designating step S149).

If no MDN response is standing by (S150), the transmission controlling means 126*a* starts controlling (S151) to stand by until a timing is reached which is specified as an MDN response timing (S152).

As the timing is reached which is specified as an MDN response timing, the transmitting means 127 transmits the notification data (transmitting step S153). If another MDN response is standing by (S154), the process from S152 onwards is repeated.

If no MDN request is contained in the reception data in S145, and one or more MDN responses are standing by (S155), the process from S152 onwards is performed. If no MDN response is standing by, the process is ended.

The above description has illustrated an MDN response transmission after the printing of a received e-mail message. An MDN response may be transmitted before the printing process, for example, after it is confirmed whether the received e-mail message or the attachment to the received e-mail message is identifiable.

A data transmission processing method in accordance with the present invention is characterized in that it involves: among the other processes, the notification condition designating step S128 where the notification condition designating means 125*a* specifies conditions for determining an MDN response timing; the transmission data composing step S132 where the transmission data composing means 118*a* composes transmission data by including notification condition information indicating the conditions specified in the notification condition designating step S128, as well as notification request information indicating an MDN request, into the data to be transmitted; and the transmitting step S103 where the transmitting means 127 transmits the transmission data.

Another data reception processing method in accordance with the present invention is characterized in that it involves: among other processes, the receiving step S142 where the receiving means 128 receives data; the notification data composing step S146 where the notification data composing means 118*b* composes notification data if the reception data received in the receiving step S142 contains notification request information indicating an MDN request; the notification condition recognizing step S148 where the notification condition recognizing means 125*b* recognizes conditions indicated in notification condition information if the reception data contains the notification condition information indicating the conditions for determining an MDN response timing; the transmission timing designating step S149 where the transmission controlling means 126*a* determines a notification data transmission timing on the basis of a result of the recognition by the notification condition recognizing step S148; and the transmitting step S153 where the transmitting means 127 transmits notification data at a timing determined by in the transmission timing designating step S149.

This enables MDNs to multiple transmission data sets to be consolidated at a time as in the foregoing.

Alternatively, the data reception processing method or the data transmitting method may employ a data reception processing program or a data transmission processing program making a computer function as the individual means and implement the steps. That is, the data reception processing method or the data transmitting method may be carried out by: storing program codes (execution program, intermediate code program, or source program) of the data reception processing program or the data transmission processing program on a storage medium so that it is readable by a computer; feeding the storage medium into a computer system or apparatus; and reading and executing the program codes stored on the storage medium using a computer in the system or apparatus.

The present embodiment has described cases where MDN as defined in RFC 2298 is used. The present invention is however not limited to the use of MDN as defined in RFC 2298. For example, the present embodiment is also applicable to DSN (Delivery Status Notification, RFC 1891/1894) where the e-mail server to which the receiving-end machine is connecting notifies the transmission destination of the status of the e-mail message.

Besides, the present embodiment has described cases where the facsimile/e-mail machine 111 has a facsimile function. The present invention is however also applicable to a communication device having only an e-mail function and no facsimile function. Further, the present embodiment has assumed e-mail messages as transmission data and reception data. The data may be data other than e-mail messages.

As in As in the foregoing, a communication device in accordance with the present invention is a communication device having a function of responding to a data disposition notification request contained in received data, and to solve the problems, includes:

receiving means for receiving data;

notification data composing means for, when received data received by the receiving means contains notification request information indicating a disposition notification request, composing notification data for disposition notification;

transmitting means for transmitting the notification data;

notification condition recognizing means for, when the received data contains notification condition information indicating conditions for determining a disposition notification timing, recognizing the conditions indicated in the notification condition information; and transmission controlling means for determining a timing of the transmitting means transmitting the notification data, on the basis of recognition by the notification condition recognizing means.

With the arrangement, if the received data contains, for example, a disposition notification request such as an MDN request in the case of an e-mail message transmitted over the Internet, the notification data composing means composes notification data for disposition notification in response to the request, and the transmitting means transmits the notification data.

Here, with the arrangement, if the received data contains notification condition information indicating conditions for determining a timing of a disposition notification, the notification condition recognizing means recognizes those conditions. Based the recognition, the transmission controlling means determines the timing of the transmitting means transmitting the notification data.

Therefore, the designation of conditions for determining a timing of a disposition notification at the data transmitting end and the transmission of data to the communication device causes the communication device to transmit notification data for disposition notification at a timing determined under the conditions.

Hence, when, for example, multiple sets of transmission data are transmitted at different times from the data transmitting end to the communication device, the transmitting end receives a consolidated disposition notification after the transmission of the last transmission data, or in other words, receives a consolidated disposition notification for multiple sets of transmission data at a time.

As a result, the task can be conveniently performed whereby, for example, the user at the transmitting end can collectively confirm the disposition notification for the multiple sets of transmission data at one time.

A data reception processing method in accordance with the present invention is a data reception processing method of responding to a data disposition notification request contained in received data, and to solve the problems, includes:

the receiving step in which receiving means receives data;

the notification data composing step in which when the received data received in the receiving step contains notification request information indicating a disposition notification request, notification data composing means composes notification data for a disposition notification;

the notification condition recognizing step in which when the received data contains notification condition information indicating conditions for defining a timing of a disposition notification, notification condition recognizing means recognizes the conditions indicated in the notification condition information;

the transmission timing designating step in which transmission controlling means determines a timing of transmitting the notification data on the basis of recognition in the notification condition recognizing step; and the transmitting step in which transmitting means transmits the notification data at the timing determined in the transmission timing designating step.

A data reception processing program in accordance with the present invention is a program implementing the data reception processing method and causes a computer to function as the individual means and carry out the steps. A computer-readable storage medium in accordance with the present invention is a storage medium on which the data reception processing program is recorded.

The program and medium can also consolidate disposition notifications for multiple sets of transmission data into a single message.

A communication device in accordance with the present invention is preferably such that in the communication device, the notification data composing means composes a single set of notification data by consolidating disposition notifications for multiple sets of received data on the basis of the recognition by the notification condition recognizing means.

With the arrangement, when, for example, it turns out that there exist multiple sets of receive data for which notification data for disposition notification should be transmitted at the same timing, disposition notifications for the multiple sets of received data can be transmitted in a single, collective set of notification data based on the recognition by the notification condition recognizing means.

This reduces the number of communications for disposition notification. Besides, in cases where communications are performed over a network, the network traffic is reduced with reduction in the number of communications.

A communication device in accordance with the present invention is preferably such that in the communication device, there is further provided reception result determining means for determining a result of reception of the received data, and that the transmission controlling means determines the timing of the transmitting means transmitting the notification data on the further basis of determination by the reception result determining means.

With the arrangement, the timing of the transmission of notification data can be determined on the basis of result of the reception of received data. Therefore, when, for example, the reception of received data is determined to have failed, notification data can be transmitted regardless of the conditions indicated in the notification condition information. As a result, when the transmitting end executes a retransmission or other process later, the process can be quickly done.

A communication device in accordance with the present invention is a communication device for transmitting data containing a disposition notification request to the communication device, and includes:

notification condition designating means for designating conditions for defining a timing of a disposition notification;

transmission data composing means for composing transmission data by incorporating notification request information indicating a disposition notification request and notification condition information indicating the conditions designated by the notification condition designating means, into data to be transmitted; and transmitting means for transmitting the transmission data.

With the arrangement, by transmitting, to the aforementioned communication device with notification condition recognizing means, transmission data incorporating notification request information indicating a disposition notification request and notification condition information indicating conditions for defining a timing of a disposition notification, disposition notifications for multiple sets of transmission data can be consolidated into a single message as in the forgoing.

A data transmitting method in accordance with the present invention is a data transmission processing method of transmitting data received by the data reception processing method, and includes:

the notification condition designating step in which notification condition designating means designates conditions for determining a timing for a disposition notification;

the transmission data composing step in which transmission data composing means composes transmission data by incorporating notification request information indicating a disposition notification request and notification condition information indicating the conditions designated in the notification condition designating step, into data to be transmitted; and the transmitting step in which transmitting means transmits the transmission data.

A data transmission processing program in accordance with the present invention is a program implementing the data transmission processing method and causes a computer to function as the individual means and carry out the steps. A computer-readable storage medium in accordance with the present invention is a storage medium on which the data transmission processing program is recorded.

The program and medium can also consolidate disposition notifications for multiple sets of transmission data into a single message.

A communication device in accordance with the present invention is preferably such that in the communication device, the notification condition information is information specifying a time for a disposition notification; and the communication device further includes:

receiving means for receiving notification data for a disposition notification;

reception managing means for determining whether the receiving means has received notification data corresponding to the transmission data within a predetermined period with respect to the time for a disposition notification specified in the notification condition information contained in the transmission data transmitted by the transmitting means; and alerting means for alerting the user when the reception managing means determines that the notification data has not been received within the period.

With the arrangement, when transmission data is transmitted with a time for a disposition notification specified, the user is alerted when no notification data corresponding to the transmission data is received within a predetermined period with respect to that time. That no notification data is received within the period is an indication of a transmission error. The alerting of the user in this manner enables retransmission or other following necessary process to be implemented quickly.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A network communication device having a function of receiving a plurality of e-mail messages, each e-mail message containing a disposition notification request, the device comprising:

disposition notification transmitting means for, when having received an e-mail message containing a disposition notification request, transmitting a disposition notification to a recipient address specified in the e-mail message, the recipient address being associated with a sender of the e-mail message; and disposition notification controlling means for controlling the disposition notification transmitting means to consolidate multiple disposition notifications, corresponding to separate e-mail messages and addressed to an identical recipient address, into a single e-mail message for transmission, such that the single e-mail message is addressed to the recipient address associated with the sender, wherein the e-mail messages containing the multiple disposition notification requests received from the sender also specify response conditions and the network communication device determines when to send the single e-mail message based on the response conditions.

2. The network communication device as set forth in claim 1, wherein the disposition notification controlling means consolidates multiple disposition notifications addressed to an identical recipient address into a single e-mail message on the basis of the response conditions for disposition notification contained in the received e-mail message.

3. The network communication device as set forth in claim 1, wherein the disposition notification controlling means, when the e-mail message has not been properly received, causes a response containing the disposition notification to be transmitted immediately.

4. A network communication device having a function of transmitting/receiving a plurality of e-mail messages, each e-mail message containing a disposition notification request, the device comprising:

disposition specification controlling means for requesting that responses to multiple disposition notification requests be consolidated into a single e-mail message;

disposition notification transmitting means for, when having received an e-mail message containing a disposition notification request, transmitting a disposition notification to a recipient address specified in the e-mail message, the recipient address being associated with a sender of the e-mail message; and disposition notification controlling means for controlling the disposition notification transmitting means to consolidate multiple disposition notifications, corresponding to separate e-mail messages and addressed to an identical recipient address, into a single e-mail message for transmission, such that the single e-mail message is addressed to the recipient address associated with the sender, wherein the e-mail messages containing the multiple disposition notification requests received from the sender also specify response conditions and the network communication device determines when to send the single e-mail message based on the response conditions.

5. A network communication device having a function of transmitting a plurality of e-mail messages, each e-mail message containing a disposition notification request, the device comprising:

disposition specification controlling means for requesting using an e-mail that responses to multiple disposition notification requests be consolidated into a single e-mail message addressed to a recipient address associated with a sender of the e-mail messages, the e-mail also specifying a standby message count used by a receiving end to determine when to send the single e-mail message.

6. The network communication device as set forth in claim 5, wherein the disposition specification controlling means is capable of specifying response conditions for disposition notification.

7. The network communication device as set forth in claim 5, wherein the disposition specification controlling means further specifies a standby time in the e-mail for the receiving end as response conditions for disposition notification, the receiving end further using the standby time to determine when to send the single e-mail message.

8. The network communication device as set forth in claim 1, wherein the disposition notification controlling means recognizes a standby message count and a standby time in the received e-mails as the response conditions for disposition notification, and the network communication device uses the standby message counts and the standby times recognized in each of the received e-mails to determine when to send the single e-mail message.

9. The network communication device as set forth in claim 5, wherein for a predetermined e-mail message, the disposition specification controlling means causes a response containing a disposition notification to be transmitted immediately.

10. The network communication device as set forth in claim 9, wherein the predetermined e-mail message is a message which has not been properly received by the receiving end.

11. The network communication device as set forth in claim 10, wherein the disposition specification controlling means is capable of specifying response conditions for disposition notification for an e-mail message except for an e-mail messages which has not been properly received.

12. The network communication device as set forth in claim 5, wherein for an e-mail message for which an urgent disposition notification is needed, the disposition specification controlling means causes a response containing a disposition notification to be transmitted immediately.

13. The network communication device as set forth in claim 12, wherein the disposition specification controlling means is capable of specifying response conditions for disposition notification for an e-mail message except for an e-mail message for which an urgent disposition notification is needed.

14. The network communication device as set forth in claim 5, wherein the disposition specification controlling means is capable of specifying response conditions for disposition notification and changes predetermined response conditions specified in an earlier transmitted e-mail message by an e-mail message transmitted later.

15. The network communication device as set forth in claim 14, wherein the disposition specification controlling means specifies a standby time for the receiving end in the earlier transmitted e-mail message and changes the standby time by the e-mail message transmitted later.

16. The network communication device as set forth in claim 14, wherein the disposition specification controlling means changes the response conditions specified in the earlier transmitted e-mail message by the e-mail message transmitted later, so as to cause a response containing a disposition notification to be transmitted immediately.

17. A network communication device having a function of receiving a plurality of data each containing a disposition notification request, the device comprising:
    disposition notification transmitting means for, when having received data containing a disposition notification request, transmitting a disposition notification to a recipient address specified in the received data, the recipient address being associated with a sender of the data; and
    disposition notification controlling means for controlling the disposition notification transmitting means to consolidate multiple disposition notifications, corresponding to separate data and addressed to an identical recipient address, into a single set of transmission data for transmission, such that the single set of transmission data is addressed to the recipient address associated with the sender,
    wherein the data containing the multiple disposition notification requests received from the sender also specify response conditions and the network communication device determines when to send the single set of transmission data based on the response conditions.

18. A network communication device having a function of transmitting a plurality of data each containing a disposition notification request, the device comprising:
    disposition specification controlling means for requesting using an e-mail that responses to multiple disposition notification requests be consolidated into a single set of data addressed to a recipient address associated with a sender of the data, the e-mail also specifying a standby message count used by a receiving end to determine when to send the single set of data.

19. A network communication device having a function of transmitting/receiving a plurality of data each containing a disposition notification request, the device comprising:
    disposition specification controlling means for requesting that responses to multiple disposition notification requests be consolidated into a single set of data;
    disposition notification transmitting means for, when having received data containing a disposition notification request, transmitting a disposition notification to a recipient address specified in the data, the recipient address being associated with a sender of the data; and
    disposition notification controlling means for controlling the disposition notification transmitting means to consolidate multiple disposition notifications, corresponding to separate data and addressed to an identical recipient address, into a single set of transmission data for transmission, such that the single set of transmission data is addressed to the recipient address associated with the sender,
    wherein the data containing the multiple disposition notification requests received from the sender also specify response conditions and the network communication device determines when to send the single set of transmission data based on the response conditions.

20. A communication device having a function of responding to a data disposition notification request contained in received data, the device comprising:
    receiving means for receiving a plurality of data;
    notification data composing means for, when received data received by the receiving means contains notification request information indicating a disposition notification request, composing notification data for disposition notification to a recipient address associated with a sender of the data;
    transmitting means for transmitting the notification data;
    notification condition recognizing means for, when the received data contains notification condition information indicating conditions for determining a disposition notification timing, recognizing the conditions indicated in the notification condition information; and
    transmission controlling means for determining a timing of the transmitting means transmitting the notification data, on the basis of recognition by the notification condition recognizing means,
    the notification data composing means composing a single set of notification data by consolidating disposition notifications for multiple sets of received data whose notification data is determined, by the transmission controlling means, to be transmitted at the same timing, on the basis of the recognition by the notification condition recognizing means.

21. The communication device as set forth in claim 20, further comprising reception result determining means for determining a result of reception of the received data, wherein the transmission controlling means determines the timing of the transmitting means transmitting the notification data on the further basis of determination by the reception result determining means.

22. The communication device as set forth in claim 20, wherein the notification condition information specifies a date on which the notification data is to be transmitted.

23. The communication device as set forth in claim 20, wherein the notification condition information specifies a time at which the notification data is to be transmitted.

24. The communication device as set forth in claim 20, wherein the notification condition information specifies a date and time at which the notification data is to be transmitted.

25. The communication device as set forth in claim 20, wherein the notification condition information specifies a day of the week on which the notification data is to be transmitted.

26. The communication device as set forth in claim 20, wherein the notification condition information schedules the notification data to be transmitted when data equivalent to a predetermined number of messages has been received.

27. A communication device for transmitting data containing a disposition notification request to the communication device of claim 20, the former communication device comprising:
   notification condition designating means for designating conditions for defining a timing of a disposition notification;
   transmission data composing means for composing transmission data by incorporating notification request information indicating a disposition notification request and notification condition information indicating the conditions designated by the notification condition designating means, into data to be transmitted; and
   transmitting means for transmitting the transmission data.

28. The communication device as set forth in claim 27, wherein the notification condition information is information specifying a timing for a disposition notification; and the communication device further comprises:
   receiving means for receiving notification data for a disposition notification;
   reception managing means for determining whether the receiving means has received notification data corresponding to the transmission data within a predetermined period with respect to the timing for a disposition notification specified in the notification condition information contained in the transmission data transmitted by the transmitting means; and
   alerting means for alerting the user when the reception managing means determines that the notification data has not been received within the period.

29. A data reception processing method of responding to a data disposition notification request contained in received data, the method comprising:

a receiving step in which receiving means receives a plurality of data;
a notification data composing step in which when the received data received in the receiving step contains notification request information indicating a disposition notification request, notification data composing means composes notification data for a disposition notification to a recipient address associated with a sender of the data;
a notification condition recognizing step in which when the received data contains notification condition information indicating conditions for defining a timing of a disposition notification, notification condition recognizing means recognizes the conditions indicated in the notification condition information;
a transmission timing designating step in which transmission controlling means determines a timing of transmitting the notification data on the basis of recognition in the notification condition recognizing step; and
a transmitting step in which transmitting means transmits the notification data at the timing determined in the transmission timing designating step,
the notification data composing step composing a single set of notification data by consolidating disposition notifications for multiple sets of received data whose notification data is determined to be transmitted at the same timing, on the basis of the recognition in the notification condition recognizing step.

30. A data transmission processing method of transmitting data received by the data reception processing method of claim 29, the notification condition designating step in which notification condition designating means designates conditions for determining a timing for a disposition notification; the transmission data composing step in which transmission data composing means composes transmission data by incorporating notification request information indicating a disposition notification request and notification condition information indicating the conditions designated in the notification condition designating step, into data to be transmitted; and the transmitting step in which transmitting means transmits the transmission data.

31. A computer-readable storage medium on which a data reception processing program is recorded, the data reception processing program implementing the data reception processing method of claim 29, the program causing a computer to function as the individual means and carry out the steps.

32. A computer-readable storage medium on which a data transmission processing program is recorded, the data transmission processing program implementing the data transmission processing method of claim 30, the program causing a computer to function as the individual means and carry out the steps.

* * * * *